United States Patent
Kamatani

(10) Patent No.: US 9,281,936 B2
(45) Date of Patent: Mar. 8, 2016

(54) PHASE DETECTOR, MOTOR DRIVE CONTROLLER, MOTOR DEVICE, AND METHOD OF DETECTING PHASE OF ROTOR

(71) Applicant: Tomohiko Kamatani, Osaka (JP)

(72) Inventor: Tomohiko Kamatani, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/628,383

(22) Filed: Feb. 23, 2015

(65) Prior Publication Data

US 2015/0256328 A1  Sep. 10, 2015

(30) Foreign Application Priority Data

Mar. 6, 2014 (JP) ................................ 2014-044226

(51) Int. Cl.
*H04L 7/00* (2006.01)
*G01D 5/244* (2006.01)
*H02P 6/16* (2006.01)

(52) U.S. Cl.
CPC ............ *H04L 7/0054* (2013.01); *G01D 5/2448* (2013.01); *H02P 6/16* (2013.01)

(58) Field of Classification Search
CPC ......... H04L 7/0054; H02P 6/182; H02P 6/06; H02P 6/16; H02P 6/08; H02P 6/14; G01D 5/2448
USPC ...................... 375/224, 227, 354; 318/400.06
See application file for complete search history.

(56) References Cited

U.S. PATENT DOCUMENTS

| | | | |
|---|---|---|---|
| 7,122,980 B2 * | 10/2006 | Kuroshima et al. | 318/400.11 |
| 8,072,175 B2 * | 12/2011 | Fukunishi | 318/619 |
| 2007/0132423 A1 | 6/2007 | Ajima et al. | |
| 2008/0297079 A1 * | 12/2008 | Kanamori et al. | 318/400.06 |
| 2009/0322266 A1 * | 12/2009 | Dahlberg et al. | 318/400.11 |
| 2010/0091926 A1 | 4/2010 | Kishibe et al. | |
| 2013/0049658 A1 * | 2/2013 | Swize | 318/400.13 |
| 2013/0099708 A1 | 4/2013 | Shimizu et al. | |

(Continued)

FOREIGN PATENT DOCUMENTS

| | | |
|---|---|---|
| EP | 1796257 A1 | 6/2007 |
| JP | 2008-178227 | 7/2008 |
| JP | 2013-099022 | 5/2013 |

(Continued)

OTHER PUBLICATIONS

European search report dated Jul. 28, 2015 in corresponding European Patent Application No. 15157016.

*Primary Examiner* — Phuong Phu
(74) *Attorney, Agent, or Firm* — Cooper & Dunham LLP

(57) ABSTRACT

A phase detector includes a crossing-point phase detection circuit to compare signals levels of pairs of sensor signals and output crossing-point phase detection signals indicating phases of crossing points between the pairs of the sensor signals, each having a signal level corresponding to a rotational position of a rotor of a motor having coils, a crossing-point level detection circuit to output crossing-point level signals indicating crossing-point levels detected, a signal selection circuit to select one of the sensor signals as a selection signal, a phase detection circuit to detect that a signal level of the selection signal has reached a threshold level, and output a phase data signal indicating a phase of the rotor corresponding to the threshold level, and a threshold-level correction circuit to correct the threshold level based on the crossing-point level signals.

11 Claims, 17 Drawing Sheets

(56) References Cited

U.S. PATENT DOCUMENTS

2013/0106326 A1 5/2013 Kamatani et al.
2013/0106327 A1 5/2013 Kamatani et al.

FOREIGN PATENT DOCUMENTS

| JP | 2013-099023 | 5/2013 |
| WO | WO2009/095979 A1 | 8/2009 |

* cited by examiner

FIG. 2

| CROSSING-POINT DETECTION SIGNAL | HIGH LEVEL (Hi) | LOW LEVEL (Low) |
|---|---|---|
| UV | U1 ≥ V1 | U1 < V1 |
| VW | V1 ≥ W1 | V1 < W1 |
| WU | W1 ≥ U1 | W1 < U1 |

FIG. 3

| PERIOD | INPUT CONDITIONS OF EACH SIGNAL | SELECTING SIGNAL | SIGNAL PHASE (°) |
|---|---|---|---|
| T1 | UV = Hi, VW = WU = Low | W1 | 150 – 210 |
| T2 | UV = VW = Hi, WU = Low | V1 | –30 – 30 |
| T3 | UV = WU = Low, VW = Hi | U1 | 150 – 210 |
| T4 | UV = Low, VW = WU = Hi | W1 | –30 – 30 |
| T5 | UV = VW = Low, WU = Hi | V1 | 150 – 210 |
| T6 | UV = WU = Hi, VW = Low | U1 | –30 – 30 |

| PHASE ERROR | AMPLITUDE RATIO |
|---|---|
| −30.0 | −0.500 |
| −22.5 | −0.383 |
| −15.0 | −0.259 |
| −7.5 | −0.131 |
| 0 | 0 |
| 7.5 | 0.131 |
| 15.0 | 0.259 |
| 22.5 | 0.383 |
| 30.0 | 0.500 |

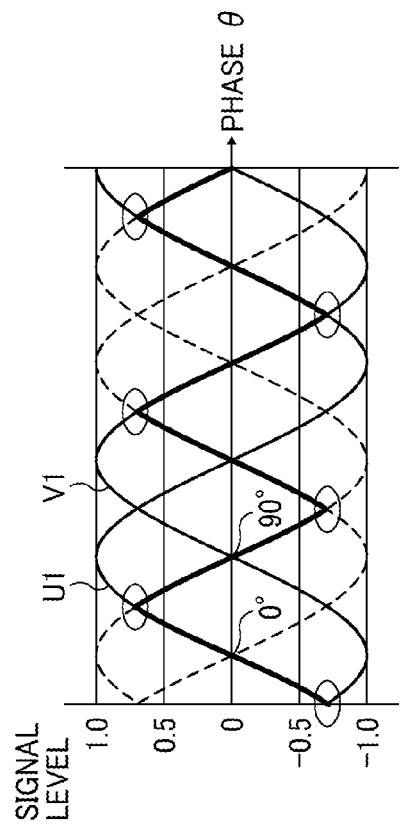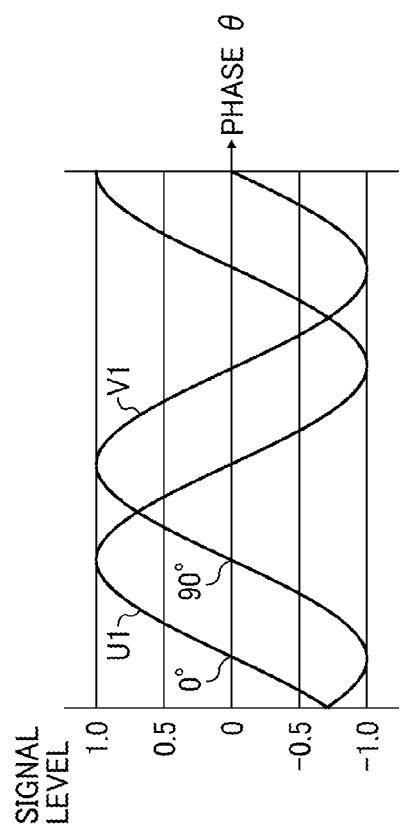

PHASE DETECTOR, MOTOR DRIVE CONTROLLER, MOTOR DEVICE, AND METHOD OF DETECTING PHASE OF ROTOR

CROSS-REFERENCE TO RELATED APPLICATIONS

This patent application is based on and claims priority pursuant to 35 U.S.C. §119(a) to Japanese Patent Application No. 2014-044226, filed on Mar. 6, 2014, in the Japan Patent Office, the entire disclosure of which is hereby incorporated by reference herein.

BACKGROUND

1. Technical Field

Embodiments of the present disclosure relate to a phase detector to detect a phase of a rotor, such as a brushless direct current (DC) motor, a motor drive controller including the phase detector, a motor device including the motor drive controller, and a method of detecting a phase of a rotor.

2. Description of the Related Art

To control driving of a motor, such as a brushless DC motor, for example, the rotation angle of a rotor of the motor is detected with a sensor to control the rotational position of the motor. For a rotary encoder system, typically, a rotary encoder is connected to a rotation shaft, outputs two-phase pulse signals, which have phase differences of one-fourth cycle changing with the rotation angle, and detects a relative rotation angle from edge detection and high/low states of the two-phase signals.

For detection of multiple phases, for example, a motor drive controller generates a phase data signal based on multiple sensor signals, each having a signal level corresponding to a rotational position of a rotor of the motor, to control driving of the motor.

SUMMARY

In at least one aspect of this disclosure, there is provided an improved phase detector including a crossing-point phase detection circuit, a crossing-point level detection circuit, a signal selection circuit, a phase detection circuit, and a threshold-level correction circuit. The crossing-point phase detection circuit compares signal levels of respective pairs of multiple sensor signals and outputs crossing-point phase detection signals indicating phases of crossing points between the respective pairs of the sensor signals. Each of the sensor signals has a signal level corresponding to a rotational position of a rotor of a motor having multiple coils. The crossing-point level detection circuit detects crossing-point levels indicating signal levels of the crossing points between the respective pairs of the sensor signals and outputs multiple crossing-point level signals indicating the crossing-point levels detected. The signal selection circuit selects one of the sensor signals as a selection signal. The phase detection circuit detects that a signal level of the selection signal has reached a threshold level, and outputs a phase data signal indicating a phase of the rotor corresponding to the threshold level which the signal level has reached. The threshold-level correction circuit corrects the threshold level based on the multiple crossing-point level signals.

In at least one aspect of this disclosure, there is provided an improved motor drive controller including the phase detector, a motor control circuit, and a motor driving circuit. The phase detector outputs the phase data signal. The motor control circuit is electrically connected to the phase detector to generate a control signal based on the phase data signal. The motor driving circuit is electrically connected to the motor control circuit to switch currents among the coils of the motor in accordance with the control signal to control driving of the motor.

In at least one aspect of this disclosure, there is provided an improved motor device including the motor and the motor drive controller electrically connected to the motor to control driving of the motor.

In at least one aspect of this disclosure, there is provided an improved method of detecting a phase of a rotor. The method including comparing signal levels of respective pairs of multiple sensor signals; outputting crossing-point phase detection signals indicating phases of crossing points between the respective pairs of the sensor signals, each of the sensor signals having a signal level corresponding to a rotational position of a rotor of a motor having multiple coils; detecting crossing-point levels indicating signal levels of the crossing points between the respective pairs of the sensor signals; outputting multiple crossing-point level signals indicating the crossing-point levels detected; selecting one of the sensor signals as a selection signal; detecting that a signal level of the selection signal has reached a threshold level; outputting a phase data signal indicating a phase of the rotor corresponding to the threshold level which the signal level has reached; and correcting the threshold level based on the multiple crossing-point level signals.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 1 is a block diagram of a configuration of a phase detector according to a first embodiment of this disclosure, with a motor and a sensor circuit.

FIG. 2 is a table of crossing-point phase detection signals UV, VW, and WU indicating comparison results of sensor signals U1, V1, and W1 in a crossing-point phase detection circuit illustrated in FIG. 1;

FIG. 3 is a table of signal selection conditions of a signal selection circuit illustrated in FIG. 1;

FIG. 4 is a timing chart of signals indicating operation states of the phase detector illustrated in FIG. 1;

FIG. 5 is a table of electric angle and amplitude ratio of a selection signal X from the signal selection circuit illustrated in FIG. 1;

FIG. 6 is a plan view of the motor mounting sensors S1 to S3 illustrated in FIG. 1;

FIG. 7 is a graph of detection phase errors of the sensor S3 illustrated in FIG. 6;

FIG. 8 is a graph of operations of the phase detector in which thresholds of zero crossing points are corrected in a sensor signal W1 of FIG. 7;

FIG. 9 is a block diagram of a configuration of a phase detector according to a first variation of the first embodiment of this disclosure, with a motor and a sensor circuit;

FIG. 10 is a block diagram of a configuration of a crossing-point level bias voltage generation circuit and a phase detection circuit of FIG. 9;

FIG. 11 is a graph of operation of the phase detector of FIG. 9;

FIGS. 19A and 19B are graphs of operation of a threshold level correction circuit in the second variation of the first embodiment of this disclosure.

Figure 1:
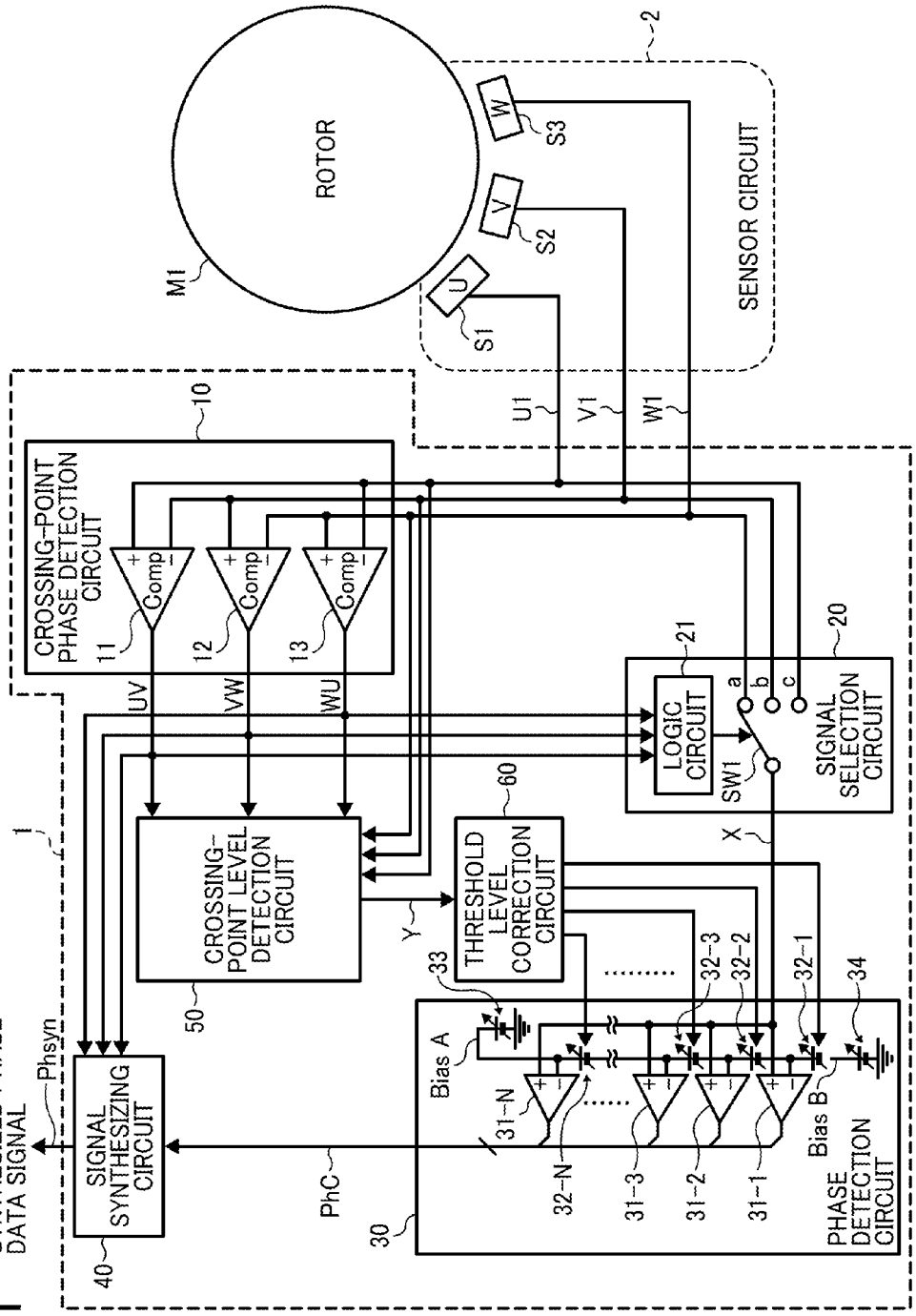

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

FIG. 1 is a block diagram of a configuration of a phase detector 1 according to a first embodiment of this disclosure, with a motor M1 and a sensor circuit 2. In FIG. 1, the phase detector 1 includes a crossing-point phase detection circuit 10, a signal selection circuit 20, a phase detection circuit 30, a signal synthesizing circuit 40, a crossing-point level detection circuit 50, and a threshold level correction circuit 60. The crossing-point phase detection circuit 10 includes three comparators (Comps) 11, 12, and 13. The signal selection circuit 20 includes a logic circuit 21 and a switch SW1. The phase detection circuit 30 includes a number N of comparators 31-1 to 31-N and a number (N+2) of variable voltage sources 32-1 to 32-N, 33, and 34.

In FIG. 1, the motor M1 is, e.g., a brushless DC motor, and the sensor circuit 2 is disposed around a rotor of the motor M1. The sensor circuit 2 includes sensors S1, S2, and S3 to detect rotation angles of U phase, V phase, and W phase, respectively, of the motor M1 spaced at a predetermined electric angle (e.g., 120°). The sensors S1 to S3 is, e.g., a magnetic sensor including a hall device and detects magnetic flux density varying with the rotation of the motor M1. The sensor circuit 2 outputs sensor signals U1, V1, and W1 of detection results of the sensors S1 to S3 to the crossing-point phase detection circuit 10, the signal selection circuit 20, and the crossing-point level detection circuit 50 of the phase detector 1. In the crossing-point phase detection circuit 10, the comparator 11 compares a signal level of the sensor signal U1 with the sensor signal V1 and generates a crossing-point phase detection signal UV indicating a phase (timing) of a crossing point of the sensor signals U1 and V1. Like the comparator 11, the comparator 12 compares the sensor signal V1 with the sensor signal W1 and generates a crossing-point phase detection signal VW indicating a phase of a crossing point of the sensor signals V1 and W1. The comparator 13 compares the sensor signal W1 with the sensor signal U1 and generates a crossing-point phase detection signal WU indicating a phase of a crossing point of the sensor signals W1 and U1.

FIG. 2 is a table of an example of the crossing-point phase detection signals UV, VW, and WU which are comparison results of the sensor signals U1, V1, and W1 in the crossing-point phase detection circuit 10. As illustrated in FIG. 2, when the sensor signal U1 has a level not less than that of the sensor signal V1, the comparator 11 of FIG. 1 generates a crossing-point phase detection signal UV having a high level (Hi). By contrast, when the sensor signal U1 has a level less than that of the sensor signal V1, the comparator 11 generates a crossing-point phase detection signal UV of a low level (Low). In the same manner as the comparator 11, the comparators 12 and 13 generate binary crossing-point phase detection signals VW and WU, respectively, according to the table of FIG. 2. As described above, the crossing-point phase detection circuit 10 compares respective pairs of the sensor signals U1, V1, and W1 and generates the crossing-point phase detection signals UV, VW, and WU indicating the phases of the crossing points of the respective pairs. The comparators 11, 12, and 13 of the crossing-point phase detection circuit 10 output the crossing-point phase detection signals UV, VW, and WU to the signal selection circuit 20, the crossing-point level detection circuit 50, and the signal synthesizing circuit 40, respectively.

FIG. 3 is a table of an example of signal selection conditions of the signal selection circuit 20 illustrated in FIG. 1. In the signal selection circuit 20 of FIG. 1, the sensor signals U1, V1, and W1 are input to terminals a, b, and c, respectively, of the switch SW1. The logic circuit 21 controls switching of the terminals a, b, and c of the switch SW1 based on the crossing-point phase detection signals UV, VW, and WU. According to input conditions of the crossing-point phase detection signals UV, VW, and WU illustrated in FIG. 3, the signal selection circuit 20 of FIG. 1 outputs a selection signal X selected from the sensor signals U1, V1, and W1 to the phase detection circuit 30.

At the rising or falling of the crossing-point phase detection signal UV, the crossing-point level detection circuit 50 of FIG. 1 detects a signal level of the sensor signal U1 or V1 and generates a crossing-point level signal Y which is a signal level of a crossing point of the sensor signals U1 and V1. At the rising or falling of the crossing-point phase detection signal VW, the crossing-point level detection circuit 50 detects a signal level of the sensor signal V1 or W1 and generates a crossing-point level signal Y which is a signal level of a crossing point of the sensor signals V1 and W1. At the rising or falling of the crossing-point phase detection signal WU, the crossing-point level detection circuit 50 detects a signal level of the sensor signal W1 or U1 and generates a crossing-point level signal Y which is a signal level of a crossing point of the sensor signals W1 and U1. The crossing-point level detection circuit 50 outputs the crossing-point level signals Y of the respective crossing point levels to a threshold level correction circuit 60. The threshold level correction circuit 60 controls voltages of the variable voltage sources 32-1 to 32-N of the phase detection circuit 30 based on the crossing-point level signals Y.

In the phase detection circuit 30 of FIG. 1, the variable voltage source 33 generates a predetermined voltage BiasA of a crossing point A that has the higher signal level of two adjacent crossing points of the selection signal X. The variable voltage source 34 generates a predetermined voltage BiasB of a crossing point B that has the lower signal level of the two adjacent crossing points of the selection signal X. The variable voltage sources 32-1 to 32-N are serially connected and inserted between the variable voltage sources 33 and 34, and generate multiple threshold levels from the voltages generated. The comparator 31-$n$ ($n=1, 2, \ldots, N$) outputs a high-level binary signal when the level of the selection signal X is not less than a threshold level of the variable voltage source 32-$n$. By contrast, the comparator 31-$n$ outputs a low-level binary signal when the level of the selection signal X is less than a threshold level of the variable voltage source 32-$n$. The phase detection circuit 30 outputs, to the signal synthesizing circuit 40, each of the binary signals of comparison results of the comparators 31-1 to 31-N as a phase data signal PhC indicating that the motor M1 has rotated to an angle. As described above, with the comparators 31-1 to 31-N, the phase detection circuit 30 detects that the signal level of the selection signal X has reached a threshold level corresponding to a phase of the rotor of the motor M1. Thus, the phase detection circuit 30 outputs, to the signal synthesizing circuit 40, the phase data signal PhC indicating the phase corresponding to the threshold level which the signal level of the selection signal X has reached.

The signal synthesizing circuit 40 obtains, for example, an exclusive OR of the phase data signals PhC and the crossing-point phase detection signals UV, VW, and WU to synthesize a toggle signal, and outputs a phase data signal Phsyn which is phase data after synthesis.

The phase detector 1 having thus configured, as described below, can detect phase data of the rotor of the motor M1 based on the sensor signals U1, V1, and W1 from the sensors S1 to S3.

Figure 4:
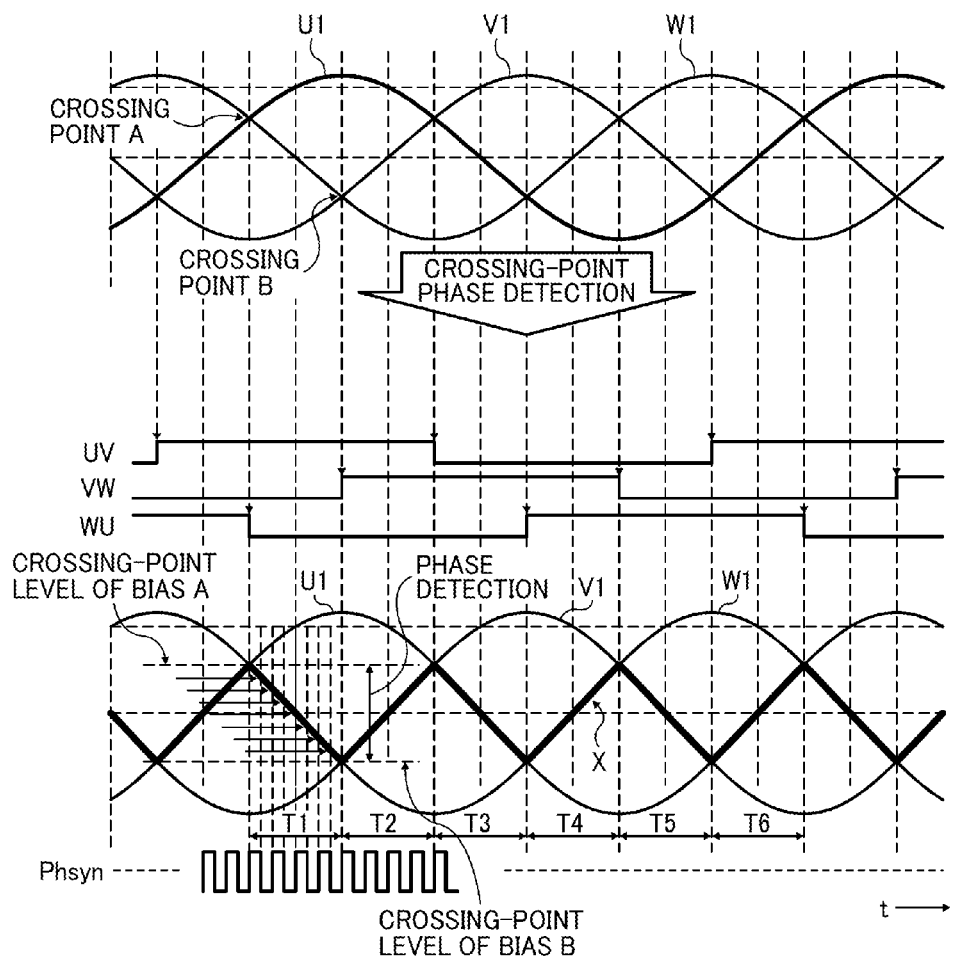

FIG. 4 is a timing chart of signals indicating operation states of the phase detector 1 of FIG. 1. In FIG. 4, the sensor signals U1, V1, and W1 from the sensors S1, S2, and S3 are indicated by sine waves (alternatively, instead of sine waves, for example, waveforms substantially the same as and in accordance with sine waves may be used), and the U phase, V phase, and W phase of the sensors S1 to S3 are set at intervals of an electric angle of 120°.

With the crossing-point phase detection circuit 10, as illustrated in FIG. 2, the crossing-point phase detection signals UV, VW, and WU can be obtained as comparison results between any two of the sensor signals U1, V1, and W1. According to the input conditions of FIG. 3, the signal selection circuit 20 selects one of the sensor signals U1, V1, and W1 per phase section between crossing-points of the sensor signals U1, V1, and W1 to obtain the selection signal X. The selection signal X thus obtained is a combined, temporally-continuous signal as illustrated by a bold line in a lower part of FIG. 4. As illustrated in FIG. 3, the selection signal X is ideally composed of 1) a time period T1 of a phase section of 60° from 150° to 210° in the sine wave of the sensor signal W1, 2) a time period T2 of a section of 60° from −30° to 30° in the sine wave of the sensor signal V1, 3) a time period T3 of a phase section of 60° from 150° to 210° in the sine wave of the sensor signal U1, 4) a time period T4 of a phase section of 60° from −30° to 30° in the sine wave of the sensor signal W1, 5) a time period T5 of a phase section of 60° from 150° to 210° in the sine wave of the sensor signal V1, and 4) a time period T6 of a phase section of 60° from −30° to 30° in the sine wave of the sensor signal U1. Each of the phase sections of 60° has a higher linearity than in each of phase sections of 60° from 30° to 90°, from 90° to 150°, from 210° to 270°, and from 270° to 310° in the sine wave. In FIG. 4, horizontal arrows attached to the selection signal X indicate the above-described threshold levels. The phase detector 1 detects that the selection signal X has reached a threshold level, and switches two levels of the phase data signal Phsyn.

Figures 5, 6:
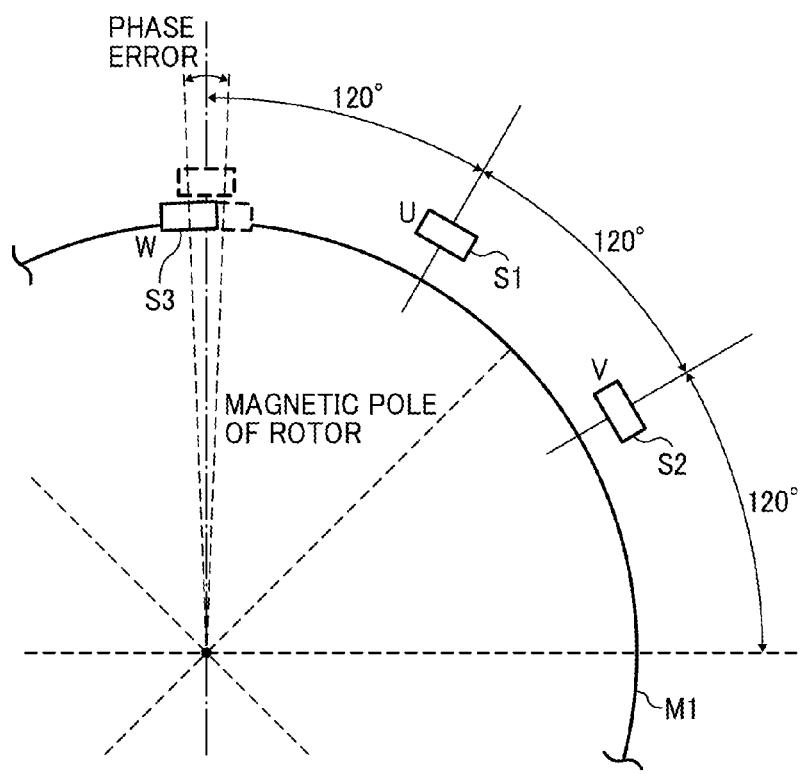

FIG. 5 is a table of electric angle and amplitude ratio of the selection signal X from the signal selection circuit 20. For example, FIG. 5 shows amplitudes and electric angles obtained when the phase detection circuit 30 divides a section of 60° from −30° to 30° into eight sub-sections of 7.5° each. It is to be noted that the amplitude ratio is normalized by setting an amplitude center level of each of the sensor signals U1, V1, and W1 selected to zero (zero cross level) and an amplitude at an electric angle of 90° to 1. The phase detection circuit 30 determines a threshold level based on each amplitude ratio for sine-wave amplitude of the selection signal X illustrated in FIG. 5. It is to be noted that the electric angles −30° and 30° are detectable with the crossing-point phase detection signals UV, VW, and WU, and the threshold levels corresponding to the electric angles −30° and 30° are not necessarily required.

With the phase detector 1 thus configured can detect the phase of the motor M1 based on the sensor signals U1, V1, and W1 from the sensors S1 to S3. Here, as described below, the sensor signals S1 to S3 may have mounting errors relative to the motor M1. However, the phase detector 1 can correct mounting errors with the threshold level correction circuit 60 and detect the phase of the motor M1.

FIG. 6 is a plan view of the motor M1 mounting the sensors S1 to S3 of FIG. 1. In FIG. 6, the motor M1 is an eight-pole inner rotor that switches eight rotor magnet poles per rotation. The electric angle makes a circuit per passage of two poles of N and S, and an electric angle of 360° corresponds to a motor angle of 90°. The sensors S1 to S3 are ideally arranged at intervals of an electric angle of 120°, which corresponds to a motor angle of 30°. As illustrated in FIG. 6, for example, the sensor S3 may be shifted from an ideal position by a phase error α. For example, when the sensors S1 to S3 are mounted below an outer periphery of the rotor of the motor M1 having a diameter of 20 mm with a phase error within an electric angle of 1° and the tolerance of phase error is within an electric angle of 1°, 15.7 mm is obtained by dividing a circumferential length 20π of an electric angle of 360° by 4 mm. Accordingly, a required mounting accuracy is 43.6 μm, which is a circumferential length corresponding to the electric angle 1°.

Figure 7:
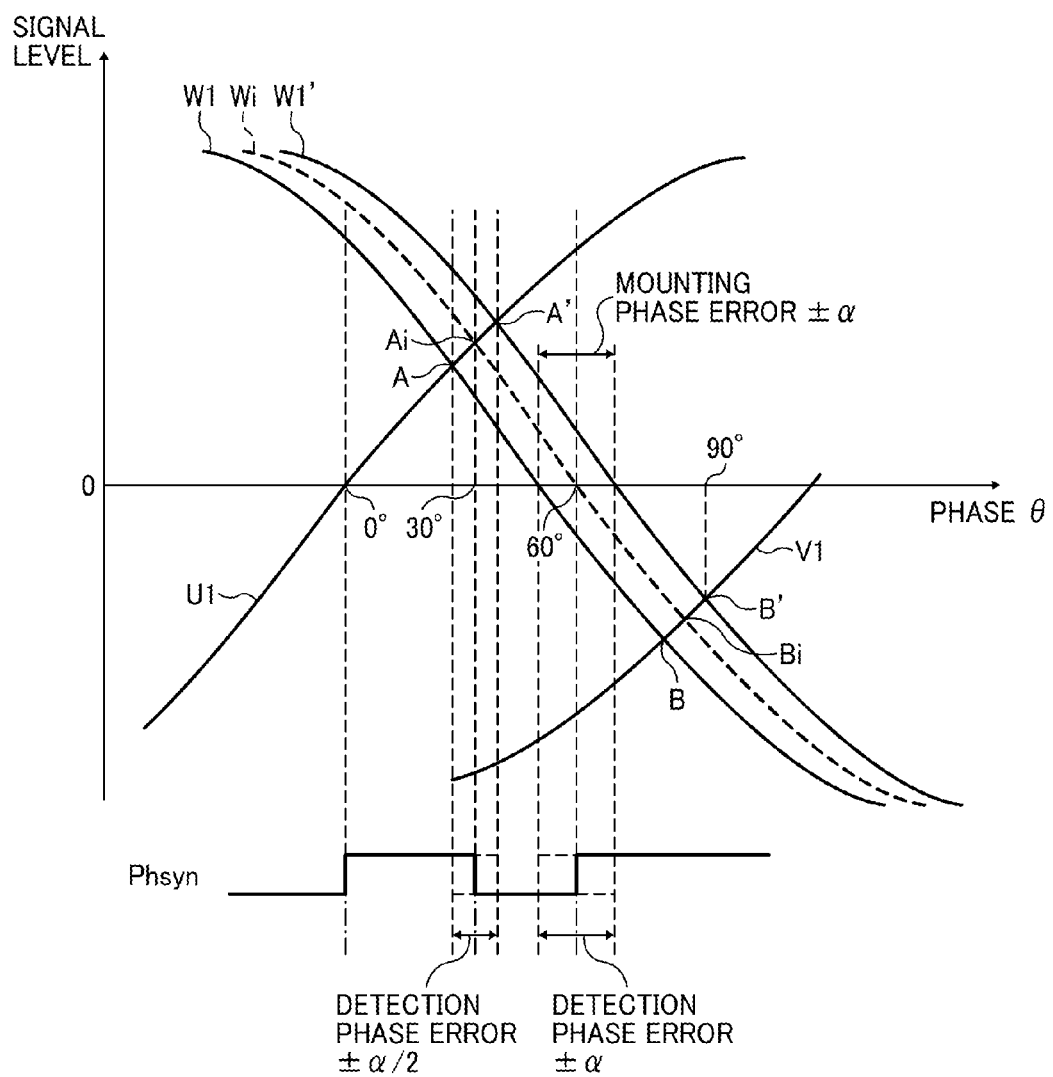

FIG. 7 is a graph of detection phase error of the sensor S3 of FIG. 6. As illustrated in FIG. 7, a phase of a zero crossing point in the phase data signal Phsyn is detected by comparing a signal level of each of the sensor signals U1, V1, and W1 wi a phase θ with a zero-crossing-level threshold of the comparator 31-$n$ ($n=1, 2, \ldots, N$). The phase of the crossing point A is detected by the crossing-point phase detection signal WU of FIG. 1 and reflected the phase data signal Phsyn which is phase data synthesized. An ideal sensor signal Wi is obtained by shifting the sensor signal U1 by a phase difference of 120° in the arrangement of FIG. 6. As the sensor S3 has a mounting phase error α, the sensor signal W1 of the sensor S3 proceeds from the ideal sensor signal Wi by a phase α. The crossing point A of the sensor signals U1 and W1 matches a crossing point Ai of the sensor signal U1 and the ideal sensor signal Wi. A crossing point B of the sensor signals V1 and W1 does not match a crossing point Bi of the sensor signal V1 and the ideal sensor signal Wi. At the zero crossing point of the sensor signal W1, the mounting phase error α of the sensor S3 directly results in a detection phase error α of the phase data signal Phsyn. By contrast, the crossing point A has a different signal level from the crossing point Ai of the sensor signal U1 and the ideal sensor signal Wi, and the detection phase error decreases at the crossing point A. For this embodiment, the crossing point Ai in the ideal sine wave corresponds to an electric angle 30°, and the phase data signal Phsyn has a detection phase error of α/2 at the crossing point A. A sensor signal W1' indicates a case in which the sensor S3 has a mounting phase error of −α, and delays from the ideal sensor signal Wi by a phase α.

Figure 8:
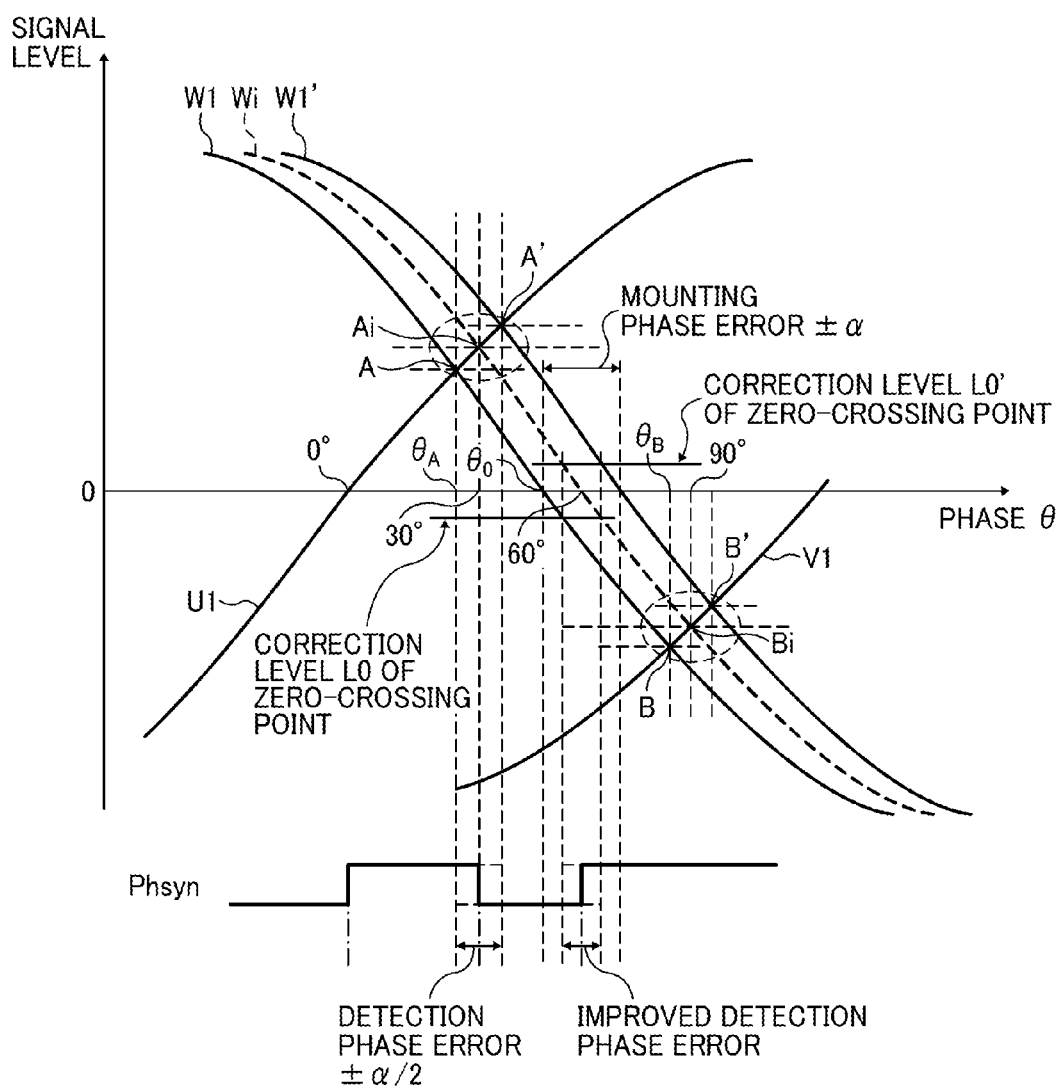

FIG. 8 is a graph of operations of the phase detector 1 in which thresholds of zero crossing points are corrected in the sensor signal W1 of FIG. 7. In FIG. 8, the sensor signals U1, W1, and V1 are substantially the same as those of FIG. 7. The threshold level correction circuit 60 of FIG. 1 controls voltages of the variable voltage sources 32-1 to 32-N of the phase detection circuit 30 based on the crossing-point level signals Y to correct the respective threshold levels. In FIG. 8, the threshold level correction circuit 60 corrects a threshold of a zero crossing level of the variable voltage source 32-n and generates a correction level L0 at the zero crossing point for the sensor signal W1. Here, the correction level L0 at the zero crossing point of FIG. 8 is calculated as a median or mid point of the signal levels of the crossing points A and B. The phase detection circuit 30 of FIG. 1 compares the sensor signal W1 to the correction level L0 at the zero crossing point. Thus, the detection phase error at the zero crossing point of the sensor signal W1 is improved to substantially the same level as the detection phase error at the crossing point A. For example, the sensor signal W1 proceeds by the mounting phase error α=5°, the ideal sensor signal Wi and the sensor signal V1 have phase differences of 120° and 140°, respectively, relative to the sensor signal U1. Therefore, a detection phase θA at the crossing point A and a detection phase θB at the crossing point B are represented by the following Formula:

[Formula 1]

$$\sin \theta A = \sin(\theta A - 240° + 5°) \quad (1)$$

$$\sin(\theta B - 240° + 5°) = \sin(\theta B - 120°) \quad (2)$$

The detection phase θA=27.5° and the detection phase θB=87.5° are obtained from Equations 1 and 2. However, since the ideal the crossing points A and B are electric angles 30° and 90°, respectively, the detection phases of the crossing points A and B proceed from the ideal crossing points by an error of 2.5°. Next, the correction level L0 at the zero crossing point and a detection phase θ0 at the zero crossing point are obtained by the following Formula:

[Formula 2]

$$L0 = (\sin(\theta A - 240° + 5°) + \sin(\theta B - 240° + 5°))/2 \approx 0.0378 \quad (3)$$

$$L0 = \sin(\theta 0 - 240° + 5°) \quad (4)$$

The detection phase at the zero crossing point θ0≈57.17° is obtained from Equations 3 and 4. However, the zero crossing point of the ideal sensor signal Wi is an electric angle of 60°. Accordingly, the detection phase at the zero crossing point proceeds from the zero crossing point of the ideal sensor signal Wi by an error of 2.83°, and is improved to substantially the same level as the detection phase error at the crossing point A. Other threshold levels can be corrected like the correction levels at the zero crossing point.

For the phase detector 1 according to this embodiment thus configured, the phase data signals PhC and Phsyn are generated based on the sensor signals U1, V1, and W1 having signal levels corresponding to rotational positions of the rotor of the motor M1 including multiple coils. The phase detector 1 includes the crossing-point phase detection circuit 10, the crossing-point level detection circuit 50, the signal selection circuit 20, the phase detection circuit 30, and the threshold level correction circuit 60. The crossing-point phase detection circuit 10 compares respective pairs of the sensor signals U1, V1, and W1, and generates and outputs the crossing-point phase detection signals UV, VW, and WU indicating the phases of the crossing points of the respective pairs. The crossing-point level detection circuit 50 detects crossing-point levels which are signal levels of the above-described crossing points, and generates and outputs crossing-point level signals Y indicating the crossing-point levels detected. The signal selection circuit 20 selects one selection signal X from the sensor signals U1, V1, and W1. The phase detection circuit 30 detects that the signal level of the selection signal X selected by the signal selection circuit 20 has reached a threshold level corresponding to a predetermined phase of the rotor, and outputs a phase data signal PhC indicating a phase corresponding to the threshold level that the selection signal X has reached. The threshold level correction circuit 60 corrects the threshold level based on the crossing-point level signals Y.

The phase detector 1 according to this embodiment can enhance the detection accuracy of rotation phases while reducing additional cost as compared to a conventional technology. In a section having good linearity in the sensor signals U1, V1, and W1 from the sensors S1 to S3, the phase detection circuit 30 compares the signal levels with multiple threshold levels, thus allowing detection of phase data of the rotor of the motor M1. Even if the sensor signals S1 to S3 have mounting errors relative to the motor M1, the phase detector 1 can correct the mounting errors with the threshold level correction circuit 60 to detect the phase of the motor M1.

The sensors S1 to S3 serving as magnetic sensors to detect the rotor of the motor M1 are, for example, hall elements, and the magnetic flux density generated by rotation of the rotor is likely to be a sine wave. In other words, signals from the magnetic sensors are also likely to be sine waves. However, the magnetic flux density generated during rotation of the rotor and received by the magnetic sensors fixed may not always be a smooth sine wave illustrated in FIG. 8 but may be a distorted sine wave. The magnetic flux density may exceed an acceptable value of the magnetic sensor and cause magnetic saturation. As a result, the output of magnetic sensor may saturate and has a shape similar to a trapezoidal wave. By contrast, the phase detector 1 can detect a phase in a nearly-straight portion of each sensor signal, such as a portion (e.g., a phase section of ±30° in sine wave) in which a waveform between two adjacent crossing points of each sensor signal is more inclined than a phase section between other crossing-points. In other words, the phase detector 1 can detect a phase in a substantially-linear portion. For example, multiple phases can be detected by using the phase detector 1 in a section of electric angles of −60° to 60° and a section of electric angles of 120° to 240° of a signal having a sine wave or a waveform close to the sine wave. The threshold level correction circuit 60 according to this embodiment corrects a threshold level of a signal having such waveform, thus enhancing the accuracy of the phase detection.

In FIG. 3, the selection signal X is obtained from the section of −30° to 30° or 150° to 210° in the sine wave of each of the sensor signals U1, V1, and W1, and is a continuous signal even when the phase section is switched and the selection signal selected changes. For the phase data signals PhC from the phase detection circuit 30, binary signals of adjacent comparison results from the comparators 31-1 to 31-N switch in turn, thus allowing a final synthesized signal to be a gray code. FIG. 5 shows a way for obtaining phase data per electric angle of 7.5°. However, the table of FIG. 5 is an example, and the way for obtaining phase data is not limited to the table of FIG. 5. For example, in some embodiments, phase data is obtained for amplitude ratios each having an electric angle of 6°. In some embodiments, by dividing a section into subsections each having an electric angle of 3°, phase data can be obtained 2.5 times as much as the phase data per electric angle of 7.5°.

Variation of First Embodiment

Figure 9:
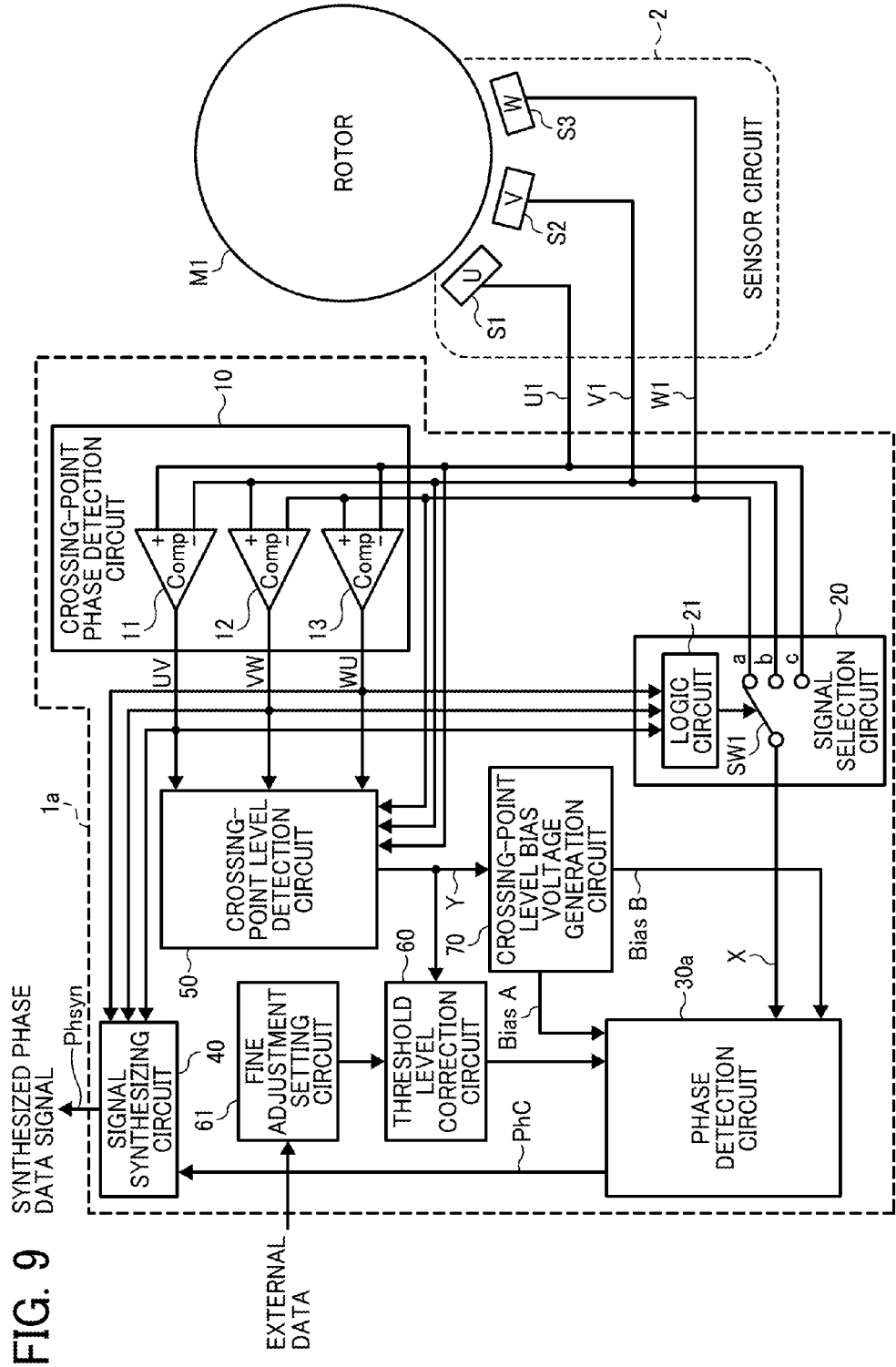
Figure 10:
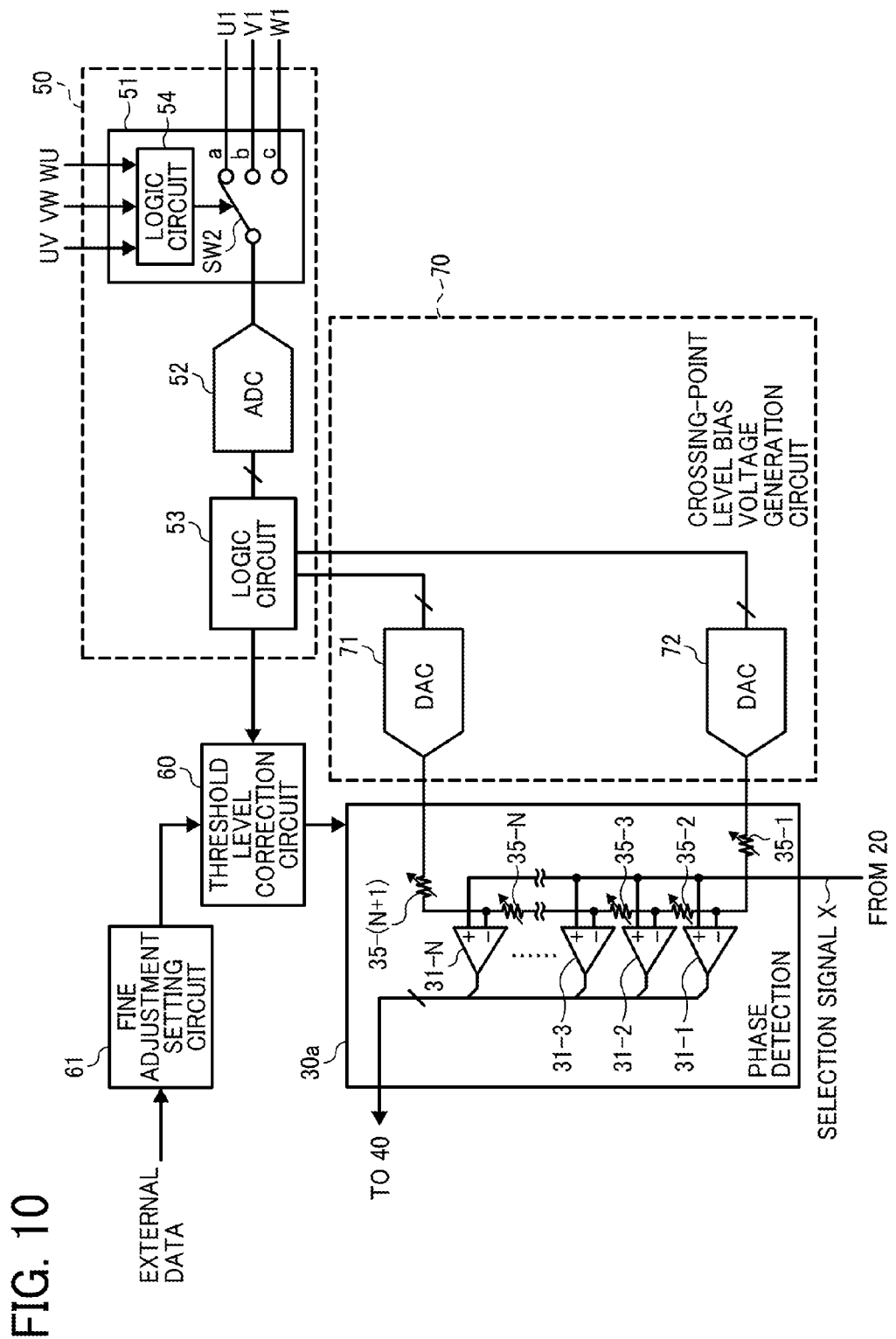

FIG. 9 is a block diagram of a configuration of a phase detector 1a according to a first variation of the first embodiment of this disclosure, with a motor M1 and a sensor circuit 2. FIG. 10 is a block diagram of a configuration of a crossing-point level bias voltage generation circuit 70 and a phase detection circuit 30a in the first variation. The phase detector 1a according to the first variation of the first embodiment differs from the phase detector 1 according to the first embodiment in that the phase detector 1a includes the crossing-point level bias voltage generation circuit 70 and the phase detection circuit 30a instead of the variable voltage sources 33 and 34 and the phase detection circuit 30, and further includes a fine adjustment setting circuit 61. The difference is described below.

In FIG. 9, the crossing-point level bias voltage generation circuit 70 generates voltages BiasA and BiasB of signal levels of the crossing points A and B based a crossing-point level signal Y, and supplies the voltages BiasA and BiasB as two signal levels for generating the above-described threshold level to the phase detection circuit 30a. Based on external data, such as observation data of harmonic components of the sensor signals U1, V1, and W1, the fine adjustment setting circuit 61 sends a computation coefficient for computation of the threshold level correction circuit 60 to the threshold level correction circuit 60 to finely adjust the threshold level.

In FIG. 10, the crossing-point level detection circuit 50 includes a signal selection circuit 51, an analog/digital converter (ADC) 52, and a logic circuit 53. The signal selection circuit 51 includes a logic circuit 54 and a switch 52. The crossing-point level bias voltage generation circuit 70 includes digital/analog converters (DAC) 71 and 72 The phase detection circuit 30a differs from the phase detection circuit 30 in that the phase detection circuit 30a includes variable resistances 35-1 to 35-(N+1) instead of the variable voltage sources 32-1 to 32-N, 33, and 34.

In the signal selection circuit 51 of FIG. 10, the sensor signals U1, V1, and W1 of FIG. 9 are input to terminals a, b, and c, respectively, of the switch SW2. The logic circuit 54 controls switching of the terminals a, b, and c of the switch SW2 based on the crossing-point phase detection signals UV, VW, and WU of FIG. 9. The signal selection circuit 51 selects a selection signal X from the sensor signals U1, V1, and W1 and outputs analog signals of respective crossing-point levels of the selection signal X. The A/D converter 52 converts the analog signals received from the signal selection circuit 51 to digital signals and outputs the digital signals to the logic circuit 53. The logic circuit 53 stores the digital signals corresponding to the respective crossing-point levels and outputs the digital signals to the threshold level correction circuit 60. The logic circuit 53 outputs, to the D/A converter 71, a digital signal of a crossing point A having a higher signal level of two adjacent crossing points of the selection signal X, and outputs, to the D/A converter 72, a digital signal of a crossing point B having a lower signal level.

In the crossing-point level bias voltage generation circuit 70, the D/A converter 71 converts the digital signal received from the logic circuit 53 to an analog signal, and outputs the analog signal as a voltage BiasA to the phase detection circuit 30a. The D/A converter 72 converts the digital signal received from the logic circuit 53 to an analog signal, and outputs the analog signal as a voltage BiasB to the phase detection circuit 30a. In the phase detection circuit 30a, the variable resistances 35-1 to 35-(N+1) are serially connected to each other and divide each of the voltages BiasA and BiasB applied to the variable resistances 35-1 to 35-(N+1). Like the variable voltage sources 32-1 to 32-N of FIG. 1, the threshold level correction circuit 60 sets respective resistance values of the variable resistances 35-1 to 35-(N+1). Inverted input terminals of the comparators 31-1 to 31-N are connected to the variable resistances 35-1 to 35-N, respectively. Like the variable voltage sources 32-1 to 32-N of FIG. 1, the voltages at the threshold levels are applied from the variable resistances 35-1 to 35-N to the inverted input terminals.

Figure 11:
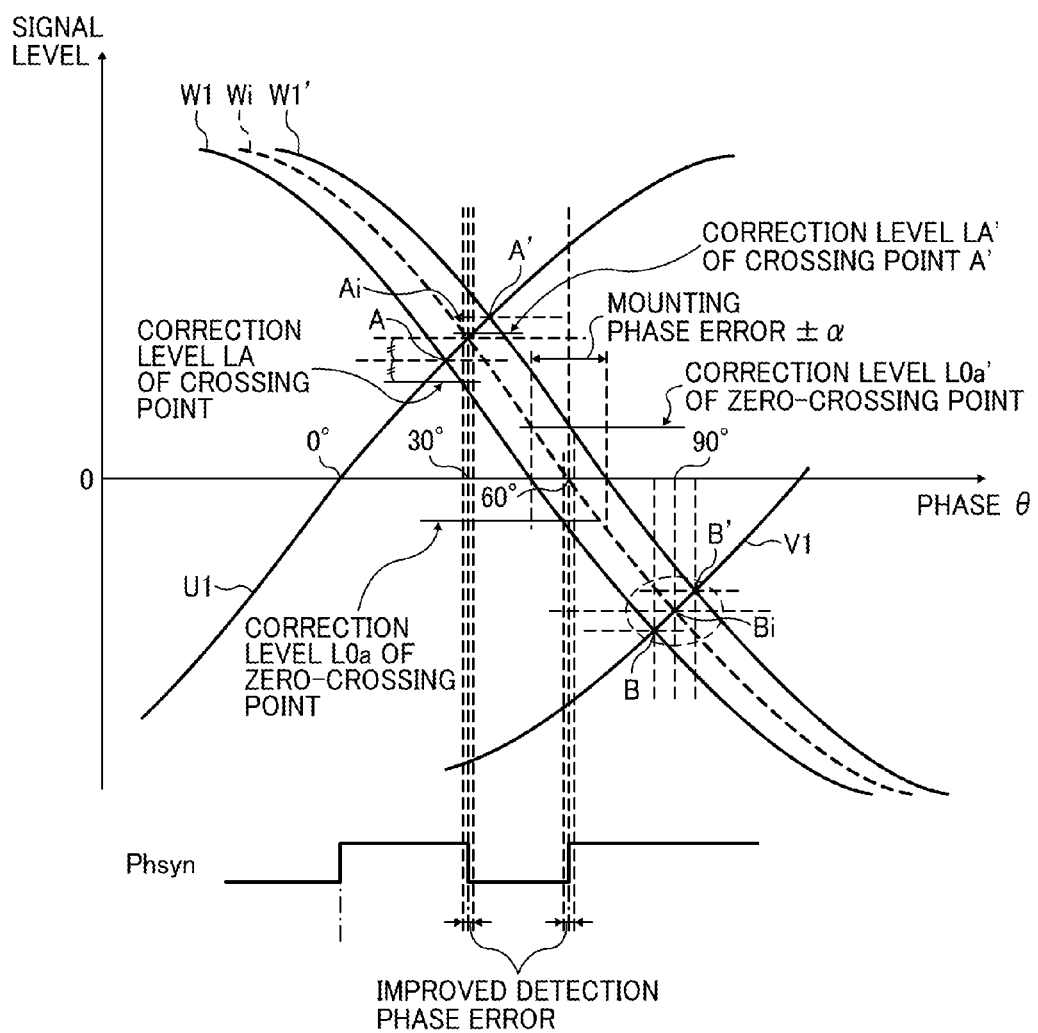

FIG. 11 is a graph of operation of the phase detector 1a of FIG. 9. Unlike the operation of FIG. 8, the threshold level correction circuit 60 according to the first variation of the first embodiment illustrated in FIG. 9 generates a correction level LA of a crossing point A and a correction level L0a of a zero crossing point based on the correction level LA, with the phase detection circuit 30a.

In FIG. 11, the threshold level correction circuit 60 of FIG. 10 sets a resistance value of the variable resistance 35-(N+1) and causes the phase detection circuit 30 to generate the correction level LA of the crossing point A. The phase detection circuit 30 compares the selection signal X with the correction level LA to detect a phase corresponding to the crossing point A. The correction level LA of the crossing point A is obtained by subtracting a value twice as large as a difference between a signal level of the crossing point Ai and a signal level of the crossing point A from the signal level of the crossing point Ai so as to accurately detect the phase of the ideal crossing point Ai by linear approximation of the selection signal X. By contrast, the correction level L0a of the zero crossing point is obtained by subtracting the difference between the signal level of the crossing point Ai and the signal level of the crossing point A and a difference between a signal level of the crossing point Bi and a signal level of the crossing point B from an ideal zero crossing level. In FIG. 11, using detection phase errors ΔθA and Δθ0 of the ideal crossing point Ai, the zero crossing point, the crossing point Bi relative to phases 30°, 60°, and 90°, detection phases (30°−ΔθA) and (60°−Δθ0) and the correction levels LA and L0a are obtained by the following Formula:

[Formula 3]

$$LA = \sin(30° - \Delta\theta A - 240° + \alpha) = \sin(-210°) - 2(\sin(-210°) - \sin(-210° + \alpha)) \quad (5)$$

[Formula 4]

$$L0a = \sin(60°-\Delta\theta0-240°+\alpha) = 0-(\sin(-210°)-\sin(-210°+\alpha))-(\sin(-150°)-\sin(-150°+\alpha)) \quad (6)$$

For example, like the table of FIG. 8, when the mounting phase error α is 5°, the correction level LA≈0.424 and the correction level L0a≈0.076 are obtained from Equation (5) and Equation (6), respectively. At this time, detection phase errors ΔθA≈0.09° and Δθ0≈0.64° are obtained. As a result, the correction levels LA and L0a enhance the accuracy of phase detection to a detection accuracy of less than 1°. The threshold level correction circuit 60 corrects the threshold level based on both a signal level of a first crossing point Ai between the ideal sensor signal Wi and the first signal, i.e., the sensor signal U1 and a signal level of a second crossing point A between the first signal U1 and a second signal, i.e., the sensor signal W1. The ideal sensor signal Wi is a signal shifted from the first signal, i.e., the sensor signal U1 by a phase difference of 120°. In Equation 5, the threshold level correction circuit 60 shifts the signal level of the second crossing point A by a difference in signal level between the first crossing point Ai and the second crossing point A and calculates the correction level LA of the second crossing point A. The threshold level correction circuit 60 sets the correction level LA of the second crossing point A as the threshold level.

For the phase detector 1a according to the first variation of the first embodiment thus configured, the crossing-point level bias voltage generation circuit 70 generates the voltages BiasA and BiasB based on the crossing-point level signal Y, thus facilitating supply of bias voltages to the phase detection circuit 30. Furthermore, the signal selection circuit 51, the A/D converter 52, and the logic circuit 53 facilitate detection of crossing-point levels in the crossing-point level detection circuit 50. The crossing-point level bias voltage generation circuit 70 constituted of the D/A converters 71 and 72 allows simple construction of a circuit for supplying to bias voltage having a restored crossing-point level to the phase detection circuit 30. As described above, the variable resistances 35-1 to 35-(N+1) divide the voltages BiasA and BiasB and generate multiple threshold levels, and the threshold level correction circuit 60 sets respective resistance values of the variable resistances 35-1 to 35-(N+1). Such a configuration facilitates correction of the threshold levels.

Second Embodiment

Figure 12:
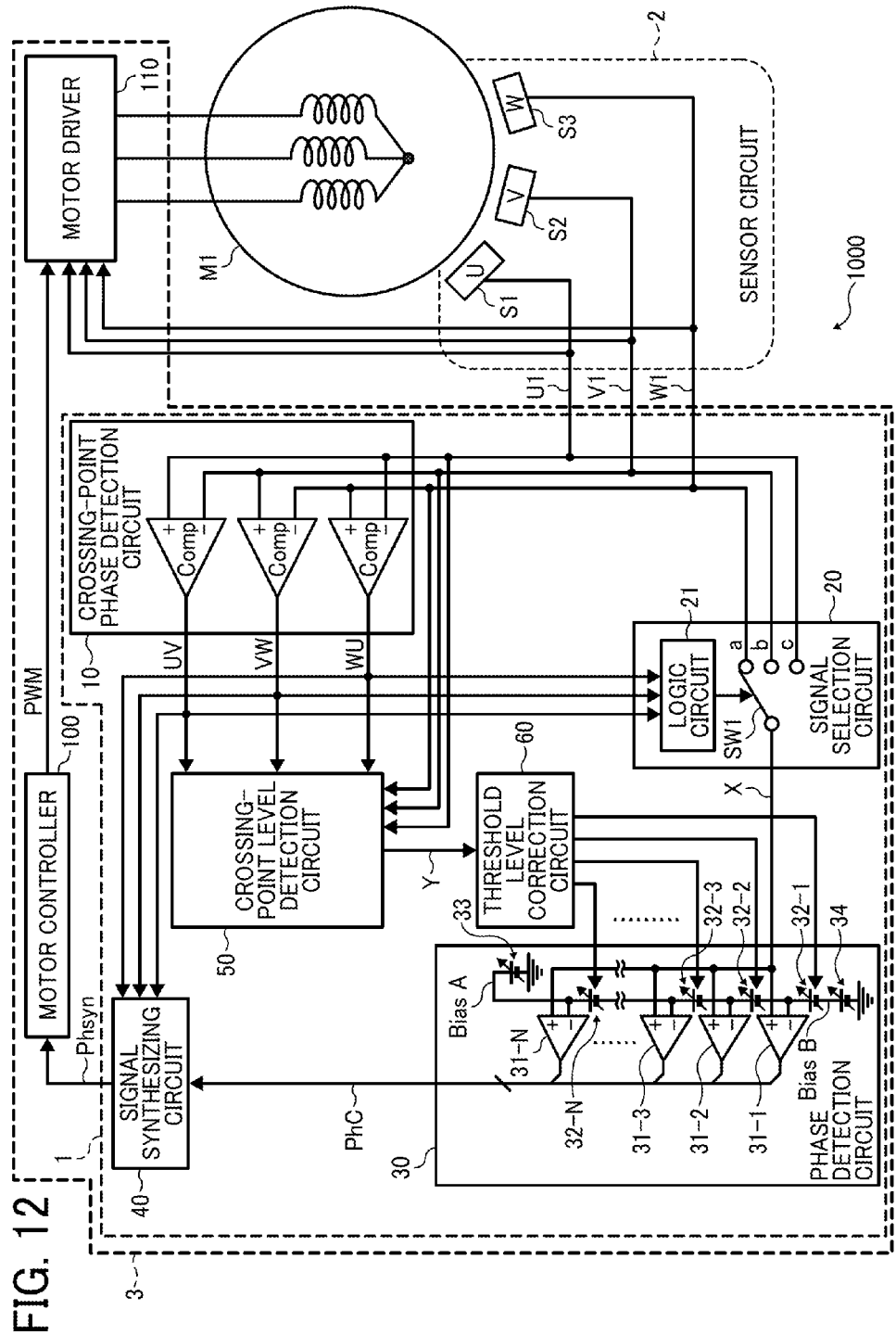
FIG. 12 is a block diagram of a configuration of a motor device according to a second embodiment of this disclosure.

FIG. 12 is a block diagram of a configuration of a motor device 1000 according to a second embodiment of this disclosure. In FIG. 12, the motor device 1000 according to this embodiment includes a motor M1, a sensor circuit 2, and a motor drive controller 3. The motor drive controller 3 includes the phase detector 1 according to the first embodiment, a motor controller 100, and a motor driver 110. The motor controller 100 is a motor control circuit to generate a pulse width modulation (PWM) signal based on a phase data signal Phsyn and output the PWM signal to the motor driver 110. According to the PWM signal of the motor controller 100, the motor driver 110 selectively applies driving currents to multiple motor coils to rotate a rotor of the motor M1.

Figure 13:
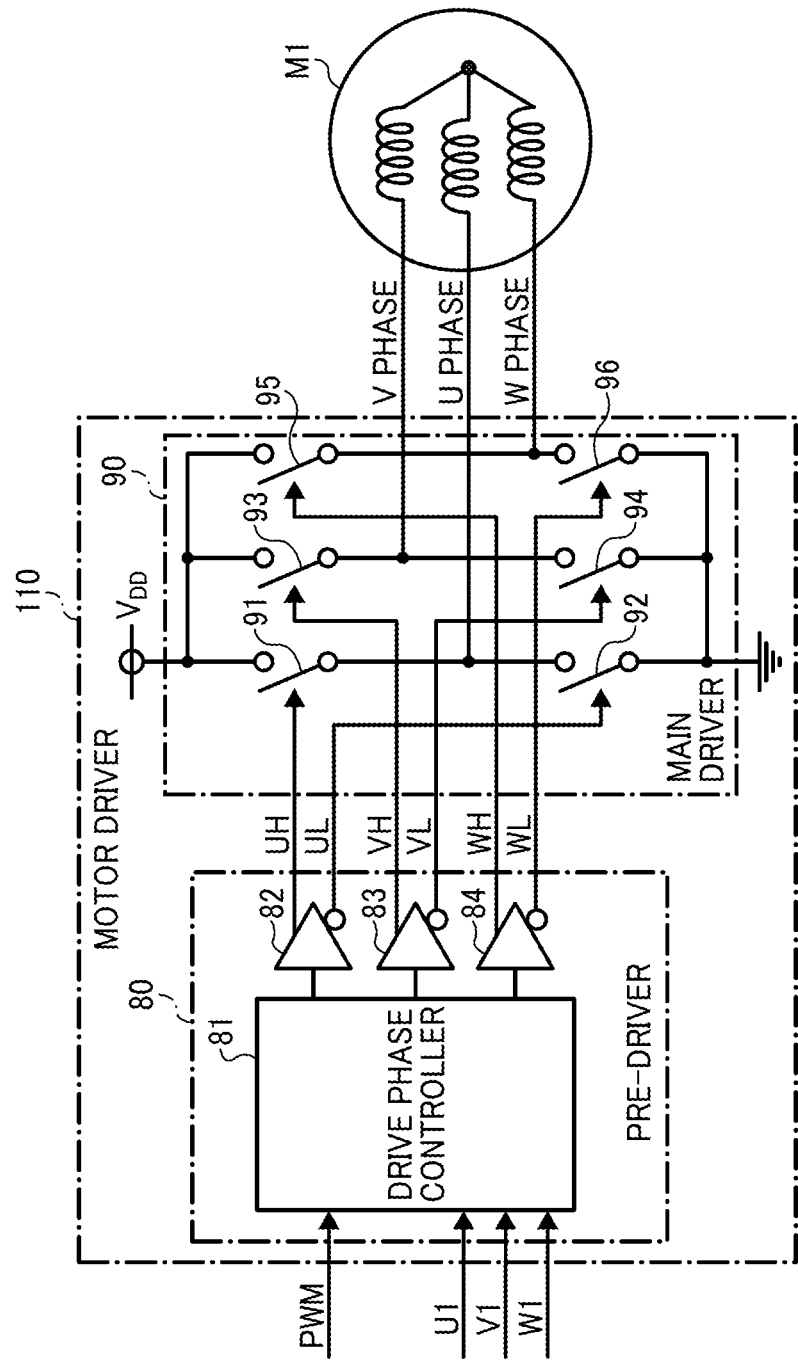
FIG. 13 is a block diagram of a configuration of a motor driver of FIG. 12.

FIG. 13 is a block diagram of a configuration of the motor driver 110 of FIG. 12. In FIG. 13, the motor driver 110 is a motor driving circuit and includes a pre-driver 80 and a main driver 90. For example, three-phase coils to drive a brushless DC motor, i.e., the motor M1 are set to U phase, V phase, and W phase, respectively. One end of each of the coils is Y-connected in the motor M1. Here, at the other end of each of the coils, the main driver 90 includes high-side switch elements 91, 93, and 95 connected to a power-supply side and low-side switch elements 92, 94, and 96 connected to a ground side. The pre-driver 80 outputs control signals UH, UL, VH, VL, WH, and WL to drive the switch elements 91, 92, 93, 94, 95, and 96, respectively.

In FIG. 13, the pre-driver 80 includes a driving phase controller 81 and three driving amplifiers 82, 83, and 84. According to the sensor signals U1, V1, and W1, the driving phase controller 81 selectively outputs the PWM signal sent from the motor controller 100 to any one of the driving amplifiers 82, 83, and 84. According to an output from the driving phase controller 81, the driving amplifier 82 generates a pair of control signals UH and UL, and controls ON/OFF of the high-side switch element 91 with the control signal UH and ON/OFF of the low-side switch element 92 with the control signal UL. According to an output from the driving phase controller 81, the driving amplifier 83 generates a pair of control signals VH and VL, and controls ON/OFF of the high-side switch element 93 with the control signal VH and ON/OFF of the low-side switch element 94 with the control signal VL. According to an output from the driving phase controller 81, the driving amplifier 84 generates a pair of control signals WH and WL and controls ON/OFF of the high-side switch element 95 with the control signal WH and ON/OFF of the low-side switch element 96 with the control signal WL.

Figure 14:
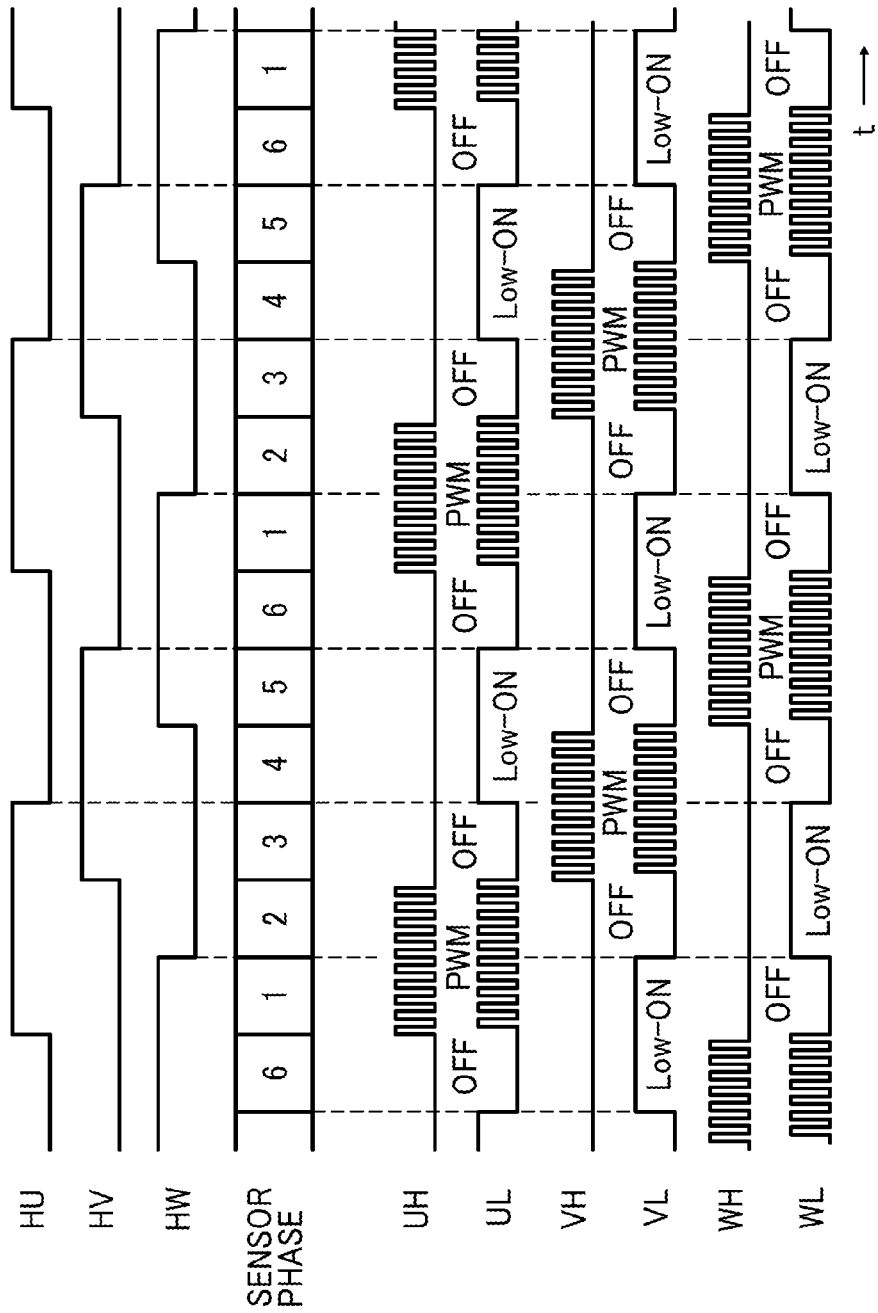
FIG. 14 is a timing charge of control signals indicating operation of the motor driver of FIG. 13.

FIG. 14 is a timing charge of control signals indicating operation of the motor driver 110 of FIG. 13. FIG. 14 shows an example of switching between phases in a signal logic of each of the sensor signals U1, V1, and W1, which is a typical driving method as a method of driving a brushless DC motor. Based on as accurate as possible phase data of the motor M1 in rotation, the motor controller 100 of FIG. 12 controls a proper duty cycle of the PWM signal and outputs the PWM signal to the motor driver 110. According to the sensor signals U1, V1, and W1, the driving phase controller 81 of FIG. 13 generates commutation signals HU, HV, and HW indicating whether each of the signal levels of the sensor signals U1, V1, and W1 is a zero-crossing level or greater. According to the commutation signals HU, HV, and HW, the driving phase controller 81 performs PWM control on one of the driving amplifiers 82, 83, and 84 and sets a pair of control signals of one of the other two driving amplifiers to the low level. The driving phase controller 81 sets a control signal of the high-side switch element of the remaining one driving amplifier to the low level and a control signal of the low-side switch element of the remaining one driving amplifier to the high level. Thus, the driving phase controller 81 distributes a signal to any one of a phase for synchronizing and rectifying the signal according to a PWM duty cycle, a phase for turning on only a low-side switch element, and a phase for turning off both a high-side switch element and a low-side switch element.

For the motor device 1000 according to the second embodiment thus configured, the sensors S1, S2, and S3 can also be used as, for example, sensors for commutation of coil currents for driving the motor M1 constituted of a brushless DC motor, thus obviating additional sensors. In other words, commutation signals of coil currents also generated by sensors of a typical motor device can be used in the motor drive controller 3 to obtain data of multiple phases with the phase detector 1.

First Variation of Second Embodiment

Figure 15:
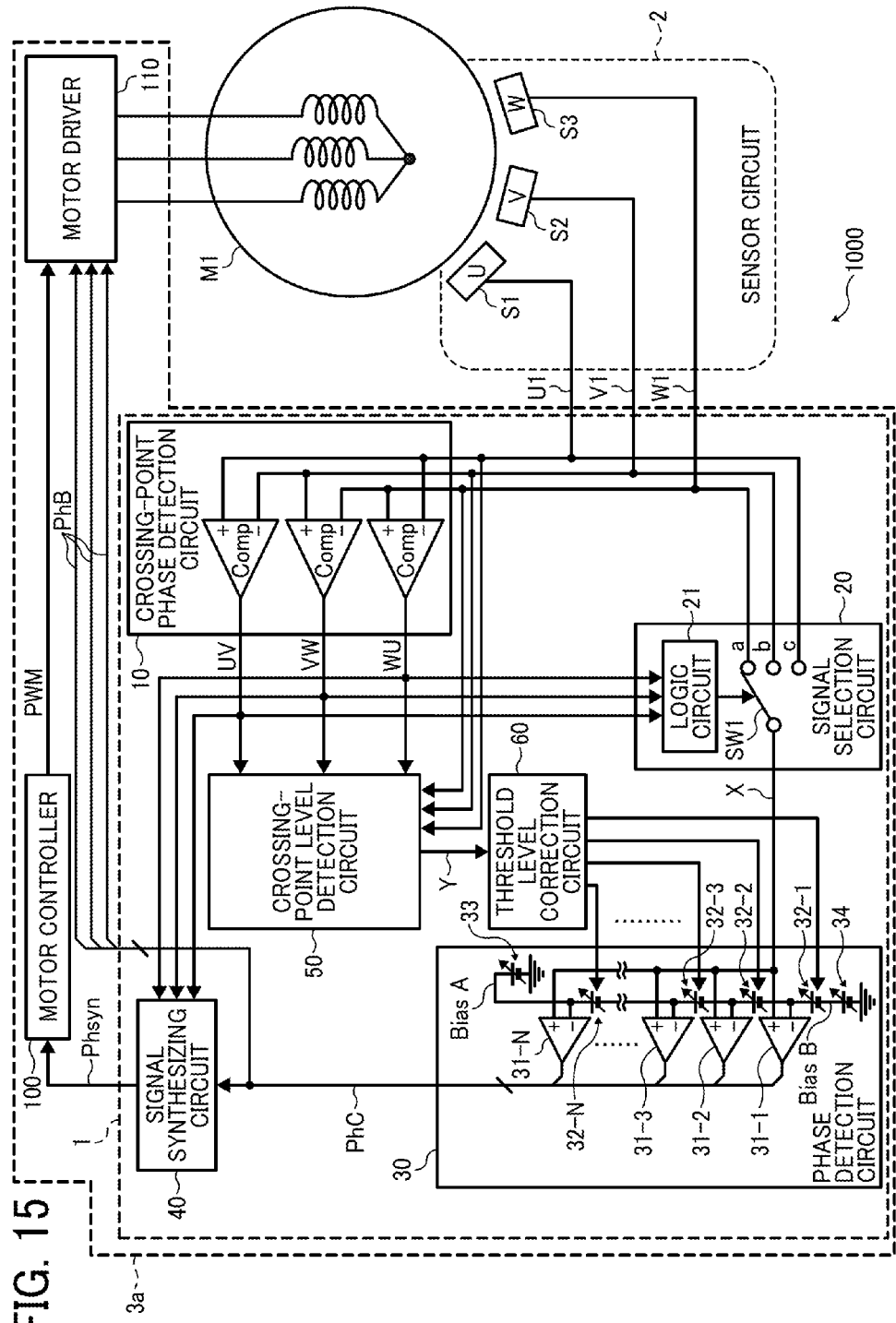
FIG. 15 is a block diagram of a configuration of a motor device according to a first variation of the second embodiment of this disclosure.

FIG. 15 is a block diagram of a configuration of a motor device 1000 according to a first variation of the second embodiment of this disclosure. The motor device 1000 according to the first variation of the second embodiment differs from the motor device 1000 according to second embodiment in that the motor device 1000 according to the first variation of the second embodiment includes a motor drive controller 3a instead of the motor drive controller 3. The motor drive controller 3a according to the first variation of the second embodiment differs from the motor drive controller 3 according to the second embodiment in that the motor driver 110 operates according to phase data signals PhB from the phase detection circuit 30 instead of the sensor signals U1, V1, and W1. Each phase data signal PhB is a binary signal indicating a result of comparison between each of the sensor signals U1, V1, and W1 and a correction level L0 of a corresponding zero crossing point, and is input to the motor driver 110. In an operation similar to that of FIG. 14, the motor driver 110 controls the driving amplifiers 82, 83, and 84 with the phase data signals PhB instead of the commutation signals HU, HV, and HW.

According to the motor drive controller 3a according to the first variation of the second embodiment thus configured, the phase data signals PhB of comparison results between the sensor signals U1, V1, and W1 and the correction levels L0 of the corresponding zero crossing points are reused as commutation signals of the coil currents. Such a configuration allows the commutation timings of the coil currents to approach more ideal settings of electric angles than the original zero crossing points, thus suppressing slight speed variations due to increased phase errors. Use of the phase data signals PhB from the phase detection circuit 30 can obviate circuits to generate the commutation signals HU, HV, and HW of the coil currents from the sensor signals U1, V1, and W1, thus reducing a circuit area.

Second Variation of Second Embodiment

Figure 16:
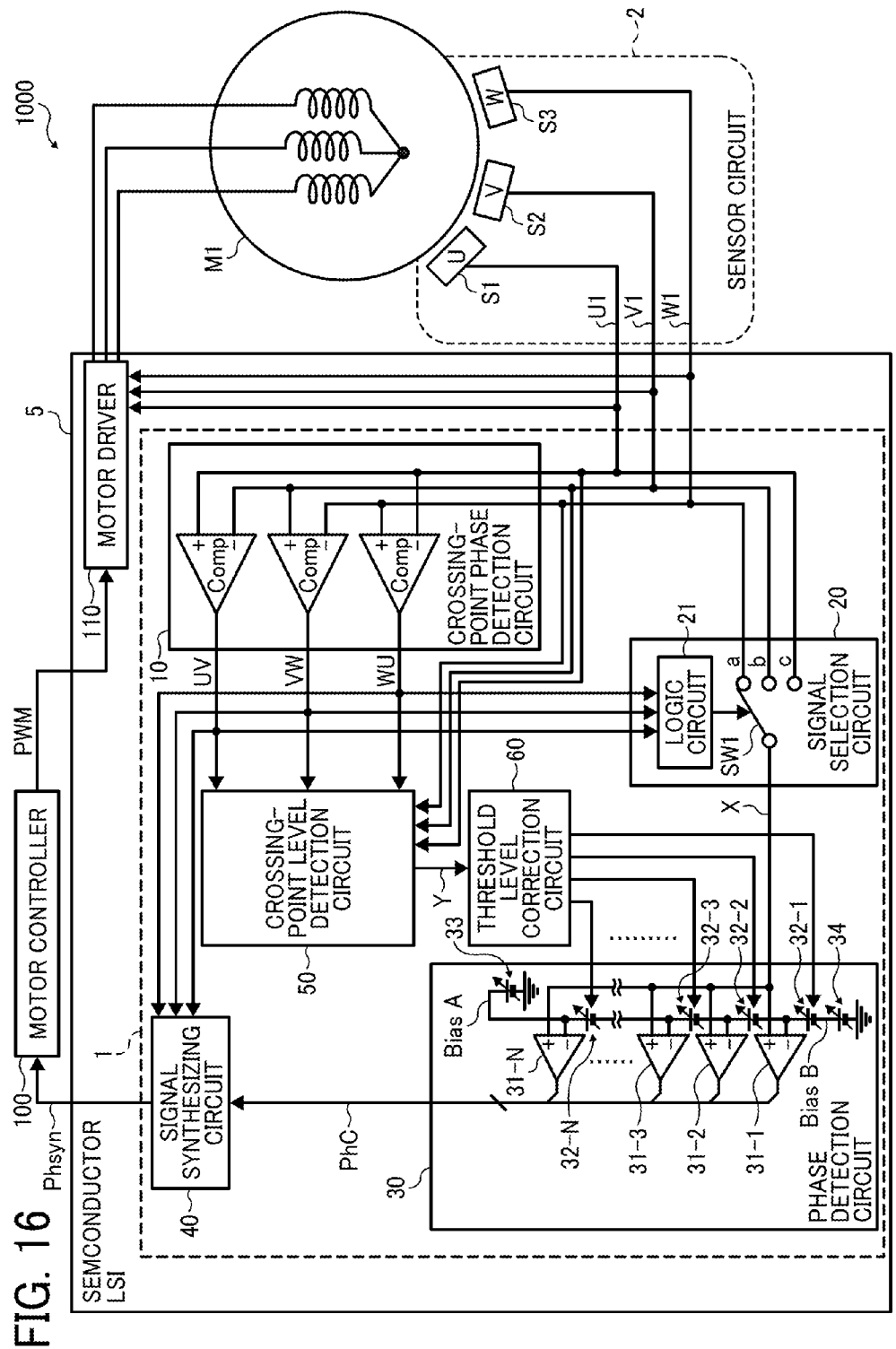
FIG. 16 is a block diagram of a configuration of a motor device according to a second variation of the second embodiment of this disclosure.

FIG. 16 is a block diagram of a configuration of a motor device 1000 according to a second variation of the second embodiment of this disclosure. For the motor device 1000 according to the second variation of the second embodiment, the phase detector 1 and the motor driver 110 of the motor device 1000 according to the second embodiment are integrated as a semiconductor large scale integrated circuit (hereinafter, semiconductor LSI) 5. The motor driver 110 is typically integrated using a semiconductor LSI. In this variation, the phase detection circuit 30 is also integrated with the semiconductor LSI into a single chip. Such a configuration allows a size reduction due to omission of an optical encoder while suppressing a size increase from a conventional device.

A configuration of integration as a semiconductor LSI is not limited to the semiconductor LSI 5 illustrated in FIG. 16. In some embodiments, only the crossing-point phase detection circuit 10 and the phase detection circuit 30 are integrated as a semiconductor LSI. In some embodiments, the motor controller 100 is integrated with the configuration of FIG. 16 as a semiconductor LSI. In some embodiments, since the motor driver 110 of FIG. 16 drives driving phase coils and may be a heating source, only the motor driver 110 is separated and other components are integrated as a semiconductor LSI.

Third Embodiment

Figure 17:
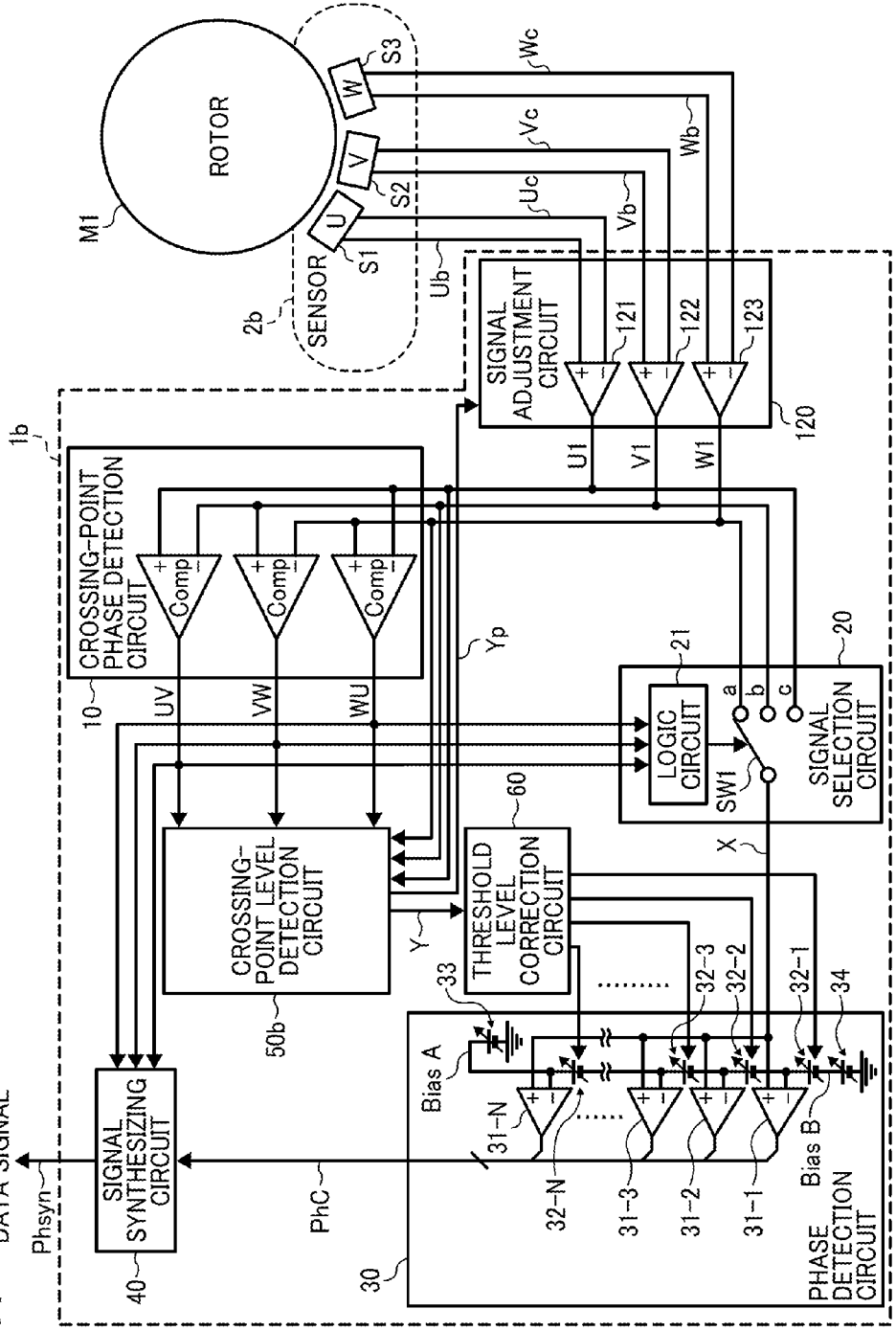
FIG. 17 is a block diagram of a configuration of a phase detector according to a third embodiment of this disclosure, with a motor and a sensor circuit.

FIG. 17 is a block diagram of a configuration of a phase detector 1b, a motor M1, and a sensor circuit 2b according to a third embodiment of this disclosure. The phase detector 1b according to the third embodiment differs from the phase detector 1 according to the first embodiment in that the phase detector 1b includes a crossing-point level detection circuit 50b instead of the crossing-point level detection circuit 50 and further includes a signal adjustment circuit 120. The difference is described below.

In FIG. 17, the signal adjustment circuit 120 includes amplifiers 121, 122, and 123. Sensors S1, S2, and S3 of the sensor circuit 2b generate detection signals Ub, Vb, and Wb of magnetic flux densities of U phase, V phase, and W phase, respectively, and reverse phase signals Uc, Vc, and Wc thereof and input the detection signals Ub, Vb, and Wb and the reverse phase signals Uc, Vc, and Wc to the signal adjustment circuit 120. The amplifiers 121, 122, and 123 of the signal adjustment circuit 120 differentially amplify the signals Ub, Vb, and Wb input to non inverting input terminals and the signals Uc, Vc, and Wc input to inverting input terminals, and generate the sensor signals U1, V1, and W1 of results of differential amplification. The sensor signals U1, V1, and W1 are input to a crossing-point phase detection circuit 10, a signal selection circuit 20 and a crossing-point level detection circuit 50.

As in the first embodiment, the crossing-point level detection circuit 50b detects crossing-point levels of respective pairs of the sensor signals U1, V1, and W1 based on timing of crossing-point detection signals UV, VW, and WU, and outputs the detected crossing-point level signals Y to a threshold level correction circuit 60. The crossing-point level detection circuit 50b also detects peak values of the signal levels of the sensor signals U1, V1, and W1 based on the sensor signals U1, V1, and W1, and outputs three peak-value signals Yp detected to the signal adjustment circuit 120. The signal adjustment circuit 120 adjusts gains of the amplifiers 121, 122, and 123 according to the peak-value signals Yp of the sensor signals U1, V1, and W1 so that signal amplitudes of the sensor signals U1, V1, and W1 are equal to one another.

For the phase detector 1b according to the third embodiment thus configured, the signal adjustment circuit 120 generates the sensor signals U1, V1, and W1 obtained by adjusting detection signals from the sensors S1, S2, and S3 with the signal adjustment circuit 120, thus suppressing variations of the sensor signals. For the sensors S1 to S3, the amplitudes of output signals may vary due to, e.g., variations among respective elements, eccentricity during rotation, or variations in magnetic pole. If the output signals including such variations are directly transmitted, errors in crossing-point detection may increase. However, in this embodiment, the signal adjustment circuit 120 reduces such errors. Furthermore, in this embodiment, the crossing-point level detection circuit 50 detects amplitudes of the sensor signals U1, V1, and W1 and controls the signal adjustment circuit 120, thus suppressing an increase in circuit scale.

Second Variation of First Embodiment

Figure 18:
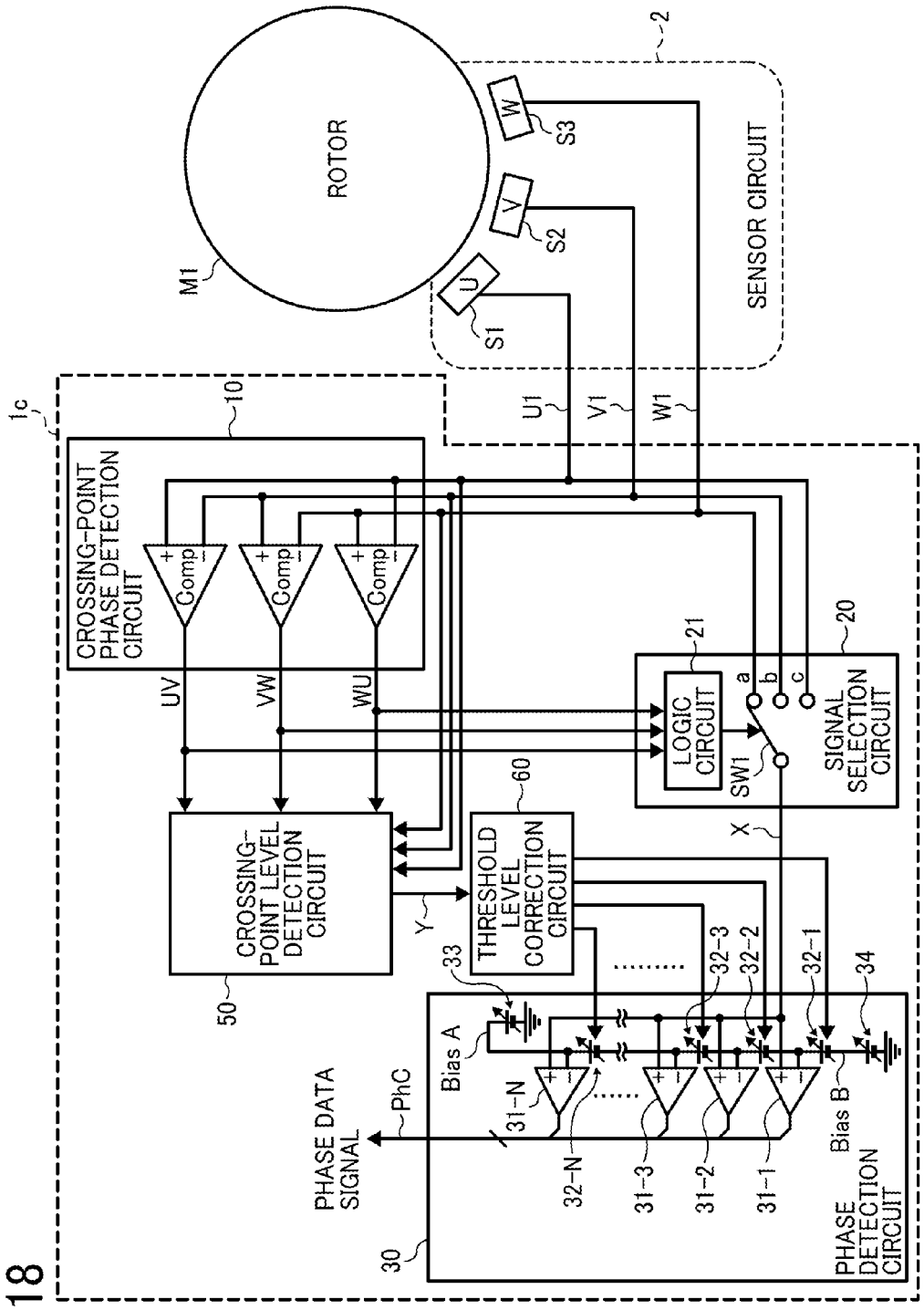
FIG. 18 is a block diagram of a configuration of a phase detector according to a second variation of the first embodiment of this disclosure, with a motor and a sensor circuit.

FIG. 18 is a block diagram of a configuration of a phase detector 1c according to a second variation of the first embodiment of this disclosure, with a motor M1 and a sensor circuit 2. The phase detector 1 according to the above-described first embodiment (FIG. 1) includes the signal synthesizing circuit 40 to output the phase data signal Phsyn. However, the configuration of the phase detector is not limited to that of the first embodiment. For example, as in the phase detector 1c according to the second variation of the first embodiment, a phase detector according to at least one embodiment of this disclosure does not include the signal synthesizing circuit 40. The phase detector 1c outputs phase data signals PhC as phase data directly to an external device.

FIGS. 19A and 19B are graphs of operation of a threshold level correction circuit 60 in the second variation. The phase detectors 1, 1a, 1b, and 1c according to the above-described embodiments of this disclosure detect rotational positions of the motor M1 for sensor signals U1, V1, and W1 of three phases. However, the number of phases is not limited to three, and rotational positions of the motor M1 can be detected for multiple sensor signals other than three. For example, in two sensor signals U1 and V1 set at intervals of an electric angle of 90° as illustrated in FIG. 19A, reverse phase signals of the sensor signals U1 and V1 are generated and superimposed as illustrated in FIG. 19B. As illustrated in FIG. 19B, by taking selection signals X based on crossing-points of the respective signals, phases can be detected at predetermined threshold levels as in the first embodiment. The predetermined threshold levels can be corrected with the threshold level correction circuit 60 in accordance with respective crossing-point levels and ideal crossing-point levels at intervals of an electric angle of 90°.

With reference to FIGS. 6 through 8 and FIG. 11, the examples in which only the sensor S3 has a mounting phase error are described above. However, the sensor having a mounting phase error is not limited to the sensor S3, and for example, the sensor S2 may also have a mounting phase error. When each of the sensors S2 and S3 has a mounting phase error, ideal sensor signals away from the sensor S1 at a certain electric angle can be set to calculate correction levels of the respective threshold levels as in the examples of FIG. 8 and FIG. 11. The same goes to sensor signals of multiple phases.

As described above, the phase detector 1 according to the first embodiment generates the voltages BiasA and BiasB of crossing-point levels with the variable voltage sources 33 and 34. The configuration of generating the voltages BiasA and BiasB is not limited to that of the first embodiment. For example, in some embodiments, voltages BiasA and BiasB of crossing-point levels are supplied from the outside of the phase detector 1. Further, in the first embodiment, the sensor circuit 2 outputs the sensor signals U1, V1, and W1 of detection results of the sensors S1 to S3. The output signals are not limited to the sensor signals U1, V1, and W1. In some embodiments, instead of the sensor signals U1, V1, and W1, the phase detector 1 performs the above-described operation on multiple sensor processing signals obtained by performing signal processing on the sensor signals U1, V1, and W1.

As described above, the phase detector 1a according to the first variation of the first embodiment (illustrated in FIG. 9) includes the fine adjustment setting circuit 61. The configuration of the phase detector is not limited to that of the first variation of the first embodiment. In some embodiments, a phase detector does not includes the fine adjustment setting circuit 61. For example, data for finely adjusting correction levels may be transmitted from an outside of the phase detector 1a to the threshold level correction circuit 60.

Ad described above, the phase detection circuit 30 calculates correction levels as illustrated in FIG. 8 and FIG. 11. However, the calculation is not limited to that described with reference to FIG. 8 or FIG. 11, and any other suitable calculation can be used. For example, the correction level LA of the crossing point A can be calculated by subtracting a signal level of the crossing point Ai from a doubled value of a signal level of the crossing point A. The correction level of the crossing point B can be calculated in the same manner. A correction level of a zero crossing point is set to, for example, an intermediate value between the correction level of the crossing point A and the correction level of the crossing point B.

As described above, in the semiconductor LSI 5 of FIG. 16, the motor drive controller including the phase detector 1 is integrated. The configuration of the semiconductor LSI is not limited to that of FIG. 16. In some embodiments, a semiconductor LSI includes, for example, the phase detectors 1, 1a, 1b, and 1c.

According to a first aspect of this disclosure, a phase detector generates and outputs a phase data signal based on multiple sensor signals, each sensor signal having a signal level corresponding to a rotational position of a rotor of a motor having multiple coils. The phase detector includes a crossing-point phase detection circuit to compare signal levels of respective pairs of the sensor signals or processed sensor signals obtained by performing certain signal processing on the sensor signals, and output crossing-point phase detection signals indicating phases of crossing points between the respective pairs of the sensor signals or the processed sensor signals; a crossing-point level detection circuit to detect crossing-point levels indicating signal levels of the crossing points between the respective pairs of the sensor signals or the processed sensor signals and output multiple crossing-point level signals indicating the crossing-point levels detected; a signal selection circuit to select one of the sensor signals or the processed sensor signals as a selection signal; a phase detection circuit to detect that a signal level of the selection signal has reached a threshold level, and output a phase data signal indicating a phase of the rotor corresponding to the threshold level which the signal level has reached; and a threshold-level correction circuit to correct the threshold level based on the multiple crossing-point level signals.

According to a second aspect of this disclosure, in the phase detector according to the first aspect of this disclosure, the threshold-level correction circuit corrects the threshold level based on a midpoint between signal levels of adjacent two crossing points of the respective crossing points.

According to a third aspect of this disclosure, in the phase detector according to the first aspect of this disclosure, the threshold-level correction circuit corrects the threshold level based on both a signal level of a first crossing point between a first signal of the sensor signals or the processed sensor signals and a signal shifted from the first signal by a phase difference and a signal level of a second crossing point between the first signal and a second signal of the sensor signals or the processed sensor signals.

According to a fourth aspect of this disclosure, in the phase detector according to the third aspect of this disclosure, the threshold-level correction circuit calculates a correction level of the second crossing point by shifting the signal level of the second crossing point by a difference between the signal level of the first crossing point and the signal level of the second crossing point, and sets the correction level of the second crossing point as the corrected threshold level.

According to a fifth aspect of this disclosure, in the phase detector according to any one of the first to fourth aspects of this disclosure, the sensor signals or the processed sensor signals have a waveform being substantially linear between adjacent two crossing points of the respective crossing points.

According to a sixth aspect of this disclosure, the phase detector according to any one of the first to fifth aspects of this disclosure further includes a crossing-point level bias generation circuit to generate crossing-point levels of adjacent two crossing points of the respective crossing points and supply the crossing-point levels of the of adjacent two crossing points as two signal levels for generating the threshold level to the phase detection circuit.

According to a seventh aspect of this disclosure, in the phase detector according to any one of the first to sixth aspects of this disclosure, the signal selection circuit selects one of the sensor signals or the processed sensor signals for each of phase sections between adjacent crossing points of the respective crossing points to obtain multiple signals selected, and combines the multiple signals selected to generate the selection signal.

According to an eighth aspect of this disclosure, the phase detector according to any one of the first to seventh aspects of this disclosure includes a signal adjustment circuit to adjust and output the sensor signals or the processed sensor signals so that signal amplitudes of the sensor signals or the processed sensor signals are equal to each other.

According to a ninth aspect of this disclosure, a motor drive controller includes the phase detector according to any one of the first to eighth aspects of this disclosure, and controls driving of the motor in accordance with the phase data signal from phase detector. The motor drive controller switches currents among the coils of the motor in accordance with the sensor signals or the processed sensor signals, or the phase data signal.

According to a tenth aspect of this disclosure, a motor device includes the motor and the motor drive controller according to the ninth aspect of this disclosure to control driving of the motor.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A phase detector, comprising:
   a crossing-point phase detection circuit to compare signal levels of respective pairs of multiple sensor signals and output crossing-point phase detection signals indicating phases of crossing points between the respective pairs of the sensor signals, each of the sensor signals having a signal level corresponding to a rotational position of a rotor of a motor having multiple coils;
   a crossing-point level detection circuit to detect crossing-point levels indicating signal levels of the crossing points between the respective pairs of the sensor signals and output multiple crossing-point level signals indicating the crossing-point levels detected;
   a signal selection circuit to select one of the sensor signals as a selection signal;
   a phase detection circuit to detect that a signal level of the selection signal has reached a threshold level, and output a phase data signal indicating a phase of the rotor corresponding to the threshold level which the signal level has reached; and
   a threshold-level correction circuit to correct the threshold level based on the multiple crossing-point level signals.

2. The phase detector according to claim 1, wherein the sensor signals are signal-processed sensor signals.

3. The phase detector according to claim 1, wherein the threshold-level correction circuit corrects the threshold level based on a midpoint between signal levels of adjacent two crossing points of the respective crossing points.

4. The phase detector according to claim 1, wherein the threshold-level correction circuit corrects the threshold level based on both a signal level of a first crossing point between a first signal of the sensor signals and a signal shifted from the first signal by a phase difference and a signal level of a second crossing point between the first signal and a second signal of the sensor signals.

5. The phase detector according to claim 4, wherein the threshold-level correction circuit calculates a correction level of the second crossing point by shifting the signal level of the second crossing point by a difference between the signal level of the first crossing point and the signal level of the second crossing point, and sets the correction level of the second crossing point as the corrected threshold level.

6. The phase detector according to claim 1, wherein the sensor signals have a waveform being substantially linear between adjacent two crossing points of the respective crossing points.

7. The phase detector according to claim 1, further comprising a crossing-point level bias generation circuit to generate crossing-point levels of adjacent two crossing points of the respective crossing points and supply the crossing-point levels of the of adjacent two crossing points as two signal levels for generating the threshold level to the phase detection circuit.

8. The phase detector according to claim 1, wherein the signal selection circuit selects one of the sensor signals for each of phase sections between adjacent crossing points of the respective crossing points to obtain multiple signals selected, and combines the multiple signals selected to generate the selection signal.

9. The phase detector according to claim 1, further comprising a signal adjustment circuit to adjust and output the sensor signals so that signal amplitudes of the sensor signals are equal to each other.

10. A motor drive controller, comprising:
    a phase detector, comprising:
      a crossing-point phase detection circuit to compare signal levels of respective pairs of multiple sensor signals and output crossing-point phase detection signals indicating phases of crossing points between the respective pairs of the sensor signals, each of the sensor signals having a signal level corresponding to a rotational position of a rotor of a motor having multiple coils;
      a crossing-point level detection circuit to detect crossing-point levels indicating signal levels of the crossing points between the respective pairs of the sensor signals and output multiple crossing-point level signals indicating the crossing-point levels detected;
      a signal selection circuit to select one of the sensor signals as a selection signal:
      a phase detection circuit to detect that a signal level of the selection signal has reached a threshold level, and output a phase data signal indicating a phase of the rotor corresponding to the threshold level which the signal level has reached; and
      a threshold-level correction circuit to correct the threshold level based on the multiple crossing-point level signals;
    a motor control circuit electrically connected to the phase detector to generate a control signal based on the phase data signal; and
    a motor driving circuit electrically connected to the motor control circuit to switch currents among the coils of the motor in accordance with the control signal to control driving of the motor.

11. A method, performed by a phase detector, of detecting a phase of a rotor, comprising:

comparing signal levels of respective pairs of multiple sensor signals;

outputting crossing-point phase detection signals indicating phases of crossing points between the respective pairs of the sensor signals, each of the sensor signals having a signal level corresponding to a rotational position of a rotor of a motor having multiple coils;

detecting crossing-point levels indicating signal levels of the crossing points between the respective pairs of the sensor signals;

outputting multiple crossing-point level signals indicating the crossing-point levels detected;

selecting one of the sensor signals as a selection signal;

detecting that a signal level of the selection signal has reached a threshold level;

outputting a phase data signal indicating a phase of the rotor corresponding to the threshold level which the signal level has reached; and correcting the threshold level based on the multiple crossing-point level signals.

* * * * *